United States Patent
Naoi et al.

(10) Patent No.: US 10,374,222 B2
(45) Date of Patent: Aug. 6, 2019

(54) ELECTRODE MATERIAL FOR LITHIUM ION SECONDARY BATTERIES, METHOD FOR PRODUCING ELECTRODE MATERIAL FOR LITHIUM ION SECONDARY BATTERIES, AND LITHIUM ION SECONDARY BATTERY

(71) Applicant: NIPPON CHEMI-CON CORPORATION, Tokyo (JP)

(72) Inventors: Katsuhiko Naoi, Fuchu (JP); Wako Naoi, Kunitachi (JP); Satoshi Kubota, Tokyo (JP); Yoshihiro Minato, Tokyo (JP); Shuichi Ishimoto, Tokyo (JP); Kenji Tamamitsu, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 695 days.

(21) Appl. No.: 14/425,296

(22) PCT Filed: Sep. 2, 2013

(86) PCT No.: PCT/JP2013/073568
§ 371 (c)(1),
(2) Date: Mar. 2, 2015

(87) PCT Pub. No.: WO2014/034933
PCT Pub. Date: Mar. 6, 2014

(65) Prior Publication Data
US 2015/0263337 A1  Sep. 17, 2015

(30) Foreign Application Priority Data

Sep. 3, 2012 (JP) ................. 2012-193615
Dec. 24, 2012 (JP) ................. 2012-280408

(51) Int. Cl.
*H01M 4/36* (2006.01)
*H01M 4/131* (2010.01)
(Continued)

(52) U.S. Cl.
CPC .......... *H01M 4/364* (2013.01); *C01G 23/005* (2013.01); *C01G 45/1242* (2013.01);
(Continued)

(58) Field of Classification Search
CPC .... H01M 4/364; H01M 4/1391; H01M 4/485; H01M 4/133; H01M 4/131; H01M 4/625;
(Continued)

(56) References Cited

U.S. PATENT DOCUMENTS

2003/0099883 A1* 5/2003 Ochoa .................. B82Y 30/00
429/232
2006/0046142 A1* 3/2006 Kasai .................... H01M 4/131
429/223

(Continued)

FOREIGN PATENT DOCUMENTS

JP     2-109260 A     4/1990
JP   2004-335310 A   11/2004
(Continued)

OTHER PUBLICATIONS

International Search Report, issued in PCT/JP2013/073568, dated Nov. 5, 2013.

*Primary Examiner* — Ula C Ruddock
*Assistant Examiner* — Matthew W Van Oudenaren
(74) *Attorney, Agent, or Firm* — Birch, Stewart, Kolasch & Birch, LLP

(57) ABSTRACT

Provided is an electrode material which leads to a lithium ion secondary battery that has high energy density. An electrode material for a lithium ion secondary battery of the present invention is characterized by containing: a coarse (Continued)

particle of a first active material that is able to act as a positive electrode active material or a negative electrode active material of a lithium ion secondary battery; and a particle of a composite composed of conductive carbon and a second active material attached to the conductive carbon that is able to act as an active material of the same electrode as the first active material. This electrode material for a lithium ion secondary battery is also characterized in that: a diameter of the coarse particle of the first active material is larger than a diameter of the particle of the composite; and the particle of the composite is filled in a gap formed between the particles of the first active material. A conductive agent can be additionally contained in the gap.

11 Claims, 9 Drawing Sheets

(51) Int. Cl.
*H01M 4/133* (2010.01)
*H01M 4/485* (2010.01)
*H01M 4/587* (2010.01)
*H01M 4/62* (2006.01)
*H01M 4/1391* (2010.01)
*C01G 23/00* (2006.01)
*C01G 51/00* (2006.01)
*C01G 45/12* (2006.01)
*H01M 4/02* (2006.01)
*H01M 4/04* (2006.01)
*H01M 4/136* (2010.01)
*H01M 4/1397* (2010.01)
*H01M 4/505* (2010.01)
*H01M 4/525* (2010.01)
*H01M 4/58* (2010.01)
*H01M 10/0525* (2010.01)

(52) U.S. Cl.
CPC ............ *C01G 51/42* (2013.01); *H01M 4/131* (2013.01); *H01M 4/133* (2013.01); *H01M 4/1391* (2013.01); *H01M 4/485* (2013.01); *H01M 4/587* (2013.01); *H01M 4/625* (2013.01); *C01P 2004/03* (2013.01); *C01P 2004/62* (2013.01); *C01P 2004/64* (2013.01); *C01P 2006/10* (2013.01); *C01P 2006/40* (2013.01); *H01M 4/043* (2013.01); *H01M 4/136* (2013.01); *H01M 4/1397* (2013.01); *H01M 4/362* (2013.01); *H01M 4/366* (2013.01); *H01M 4/505* (2013.01); *H01M 4/525* (2013.01); *H01M 4/5825* (2013.01); *H01M 10/0525* (2013.01); *H01M 2004/021* (2013.01); *H01M 2004/027* (2013.01); *H01M 2004/028* (2013.01); *H01M 2220/20* (2013.01); *H01M 2220/30* (2013.01)

(58) Field of Classification Search
CPC .... H01M 4/587; H01M 4/5825; H01M 4/505; H01M 4/136; H01M 4/525; H01M 4/1397; H01M 4/366; H01M 10/0525; H01M 2004/028; H01M 2004/027; H01M 2220/30; H01M 2220/20; C01P 2004/62; C01P 2004/64
See application file for complete search history.

(56) References Cited

U.S. PATENT DOCUMENTS

| | | | | |
|---|---|---|---|---|
| 2008/0241646 | A1 | 10/2008 | Sawa et al. | |
| 2009/0297947 | A1* | 12/2009 | Deng | H01M 4/0471 429/218.1 |
| 2010/0025627 | A1 | 2/2010 | Naoi et al. | |
| 2010/0081055 | A1* | 4/2010 | Konishi | H01M 4/364 429/223 |
| 2010/0285366 | A1* | 11/2010 | Endoh | H01M 4/13 429/231.95 |
| 2011/0311875 | A1* | 12/2011 | Lee | H01M 4/362 429/231.95 |
| 2012/0058397 | A1* | 3/2012 | Zhamu | H01M 4/13 429/231.8 |
| 2012/0183860 | A1* | 7/2012 | Naoi | H01G 11/24 429/231.8 |
| 2012/0202113 | A1* | 8/2012 | Hodge | H01M 4/136 429/211 |
| 2012/0328944 | A1 | 12/2012 | Tsukagoshi et al. | |

FOREIGN PATENT DOCUMENTS

| | | | |
|---|---|---|---|
| JP | 2005-209591 | A | 8/2005 |
| JP | 2005209591 | * | 8/2005 |
| JP | 2007-160151 | A | 6/2007 |
| JP | 2008-243684 | A | 10/2008 |
| JP | 2010-92622 | A | 4/2010 |
| JP | 2012-212634 | A | 11/2012 |
| WO | WO 2011/077754 | A1 | 6/2011 |

* cited by examiner (a) Example 3

(b) Comparative Example 3

(a) Example 10  (b) Example 11  (c) Comparative Example 9

ELECTRODE MATERIAL FOR LITHIUM ION SECONDARY BATTERIES, METHOD FOR PRODUCING ELECTRODE MATERIAL FOR LITHIUM ION SECONDARY BATTERIES, AND LITHIUM ION SECONDARY BATTERY

BACKGROUND OF THE INVENTION

1. Field of the Invention

The present invention relates to an electrode material for a lithium ion secondary battery with a high energy density, a method for producing the electrode material, and a lithium ion secondary battery with a positive electrode and/or negative electrode using this electrode material.

2. Description of the Related Art

A lithium ion secondary battery using a nonaqueous electrolyte with a high energy density is widely used as a power source for information devices including cellphones and laptop computers. However, to cope with the increased power consumption that accompanies the enhanced performance of these information devices and the increased amount of information processed by them, enhancement of the energy density of the lithium ion secondary battery is desired. Moreover, in the light of demands to decrease oil consumption, alleviate air pollution, and reduce carbon dioxide emissions that lead to global warming, there are expectations that low-emission vehicles including electric vehicles and hybrid vehicles will take the place of gasoline vehicles and diesel vehicles. For the motor driving power supply in these low pollution vehicles, the development of a large-sized lithium ion secondary battery with a high energy density is desired.

A mainstream existing lithium ion secondary battery using a nonaqueous electrolytic solution uses lithium cobalt oxide ($LiCoO_2$) as a positive electrode active material, graphite as a negative electrode active material, and a solution in which lithium salt such as lithium hexafluorophosphate ($LiPF_6$) is dissolved in a nonaqueous solvent such as ethylene carbonate and propylene carbonate as an electrolyte. However, it is difficult to use lithium cobalt oxide as the positive electrode active material in a large amount because cobalt is expensive. Also, the discharge capacity of lithium cobalt oxide is not necessarily satisfactory. As for graphite as the negative electrode active material, an existing secondary battery already provides a capacity almost equal to the theoretical capacity, and consideration of a negative electrode active material that can replace graphite would be indispensable to attain higher capacitance in the secondary battery. Therefore, a great number of considerations have been made in search of a new positive electrode active material and a negative electrode active material (for example, see Patent Document 1 (JP H2-109260 A) and Patent Document 2 (JP 9007-160151 A).

These active materials are generally used in the form of a composite material with a conductive agent. Conductive carbon such as carbon black, natural graphite, artificial graphite and carbon nanotube is used as the conductive agent. The conductive carbon, when used together with an active material with low conductivity, plays a role in giving conductivity to the composite material. Also, the conductive carbon serves as a matrix to absorb volume change in accordance to occlusion and release of lithium in the active material and also plays a role to secure an electron conducting path if the active material is mechanically damaged.

The composite material of an active material and conductive carbon is generally manufactured by a method to mix a particle of the active material and the conductive agent, or a method to produce the active material and concurrently support the active material produced on the conductive agent. For example, Patent Document 1 discloses a positive electrode of a lithium ion secondary battery in which $LiMn_2O_4$, which is obtained by dissolving a lithium source such as lithium nitrate or lithium hydroxide in water, adding manganese nitrate as a manganese source to the solution, and giving heat treatment to the solution, is mixed with a conductive agent such as acetylene black and pressure-formed. Also, in Patent Document 2, the applicant has proposed, as a method to produce an active material of metal oxide and concurrently support the metal oxide produced on conductive carbon powder as a conductive agent, a reaction method to promote chemical reaction by adding shear stress and centrifugal force to a reactant in a turning reactor. This document shows that a composite material in which a nanoparticle of an oxide such as titanium oxide and ruthenium oxide is supported on conductive carbon powder in a highly dispersed state by a sol-gel reaction accelerated by addition of shear stress and centrifugal force is suitable for a positive electrode or a negative electrode of a lithium ion secondary battery.

PRIOR ARTS DOCUMENTS

Patent Documents

Patent Document 1: JP H2-109260 A
Patent Document 2: JP 2007-160151 A

BRIEF SUMMARY OF THE INVENTION

1. Problems to be Solved by the Invention

As mentioned above, development of a lithium ion secondary battery with a high energy density is required, and to obtain such a lithium ion secondary battery, the quantity of an active material in a positive electrode and/or a negative electrode needs to be increased. In consideration of this, it is required to compose the positive electrode and/or the negative electrode by using a composite material in which a particle with a relatively large particle diameter is used as the active material and conductive carbon as a conductive agent is filled in a gap formed between adjacent particles.

However, the conductive carbon does not generally contribute to the improvement of the energy density of the lithium ion secondary battery, and the conductive carbon does not easily go into the gap formed between the active material particles and therefore increasing the gap between adjacent active material particles. Therefore, improvement of energy density by the positive electrode and/or the negative electrode using the aforementioned composite material has its limits.

Therefore, the objective of the present invention is to provide an electrode material that leads to a lithium ion secondary battery with a high energy density.

2. Means for Solving Problems

It is known that the composite of conductive carbon and a fine active material attached to the conductive carbon, which can be obtained by the method described in Patent Document 2, exhibits a relatively high conductivity. The inventors, after keen examination, have found that it is possible to fill this composite having a high conductivity between the particles of an active material with a relatively large particle diameter without enlarging the gap, and by using this composite, the energy density of a lithium ion secondary battery could be improved.

Therefore, the present invention firstly relates to an electrode material for a lithium ion secondary battery that comprises a particle of a first active material that can function as a positive electrode active material or a negative electrode active material of a lithium ion secondary battery and a particle of a composite of conductive carbon and a second active material attached to the conductive carbon that can function as an active material of the same electrode as the first active material, where the diameter of the particle of the first active material is larger than the diameter of the particle of the composite, and where the particle of the composite is filled in a gap formed between particles of the first active material.

Hereinafter, the particle of the first active material is referred to as a "coarse particle" and the particle of a composite with a smaller particle diameter than this coarse particle is referred to as a "minute particle." There is no restriction as to the shape of the coarse particle, the minute particle, a particle of conductive carbon and the second active material which compose the minute particle, and a particle of a conductive agent described below; the shape can be needle-shaped, tubular or fibrous. If the shape is needle-shaped, tubular or fibrous, the term "particle diameter" signifies the diameter (the minor axis) of the cross-section of the particle. The particle of the active material can be either an initial particle or a secondary particle formed by the aggregation of initial particles, but it is preferable that the second active material is attached to the conductive carbon in a highly dispersed state with low aggregation rate.

FIG. 1 schematically displays the electrode material of the present invention. After the coarse particles, the minute particles of a composite with a relatively high conductivity, and a conductive agent that is added as needed, are added to a solvent, in which a binder is dissolved as needed, are sufficiently kneaded (left side of FIG. 1), an obtained kneaded mixture is coated on a collector and the kneaded mixture is dried as needed, and then the coating film is given rolling treatment, the coarse particles mutually approach and contact each other by the pressure, the composite and the conductive agent that is added as needed are pushed out and fill the gap formed between adjacent coarse particles (right side of FIG. 1). As a result, in the positive electrode or the negative electrode obtained after rolling treatment, a large part of the minute particles of the composite and the conductive agent that is added as needed exist in the gap surrounded by multiple coarse particles that contact each other. The conductive carbon and the particles of the second active material attached to the carbon, which compose the composite, exist as an integrated body through the aforementioned processes of from kneading to rolling, and do not separate from each other. The reason why a large part of the composite fills the gap surrounded by multiple coarse particles is not clear at present, but it is probably because at least a part of the structure of the conductive carbon is destroyed when the composite is formed and an elastic composite is formed, and due to the elasticity, the minute particles of the composite are transformed and moved to the gap during the process of rolling. In the electrode material for a lithium ion secondary battery of the present invention, a conductive agent composed of conductive carbon can be comprised in addition to the coarse particles and the minute particles of the composite. When both the conductive agent and the composite fill the gap, it is preferable that the electric conductivity of the mixture of the composite and the conductive agent is $10^{-3}$ s/cm or more. This is because the advantageous effect of the present invention can be obtained especially well when the electric conductivity is $10^{-3}$ s/cm or more. The energy density of a lithium ion secondary battery is improved by the active material in the composite filled in the gap.

The first active material and the second active material are the active materials of the same electrode. That is, if the first active material is a positive electrode active material, the second active material is also a positive electrode active material, and if the first active material is a negative electrode active material, the second active material is also a negative electrode active material. As the positive electrode active material and the negative electrode active material, a heretofore-known positive electrode active material and a heretofore-known negative electrode active material can be used without particular restriction. The first active material and the second active material do not need to be the same chemical compound.

It is preferable that the second active material is a metal oxide. This is because a metal oxide is less expensive than other active materials and a highly conductive composite of a metal oxide and conductive carbon is suitably manufactured by a method described in Patent Document 2. In the present invention, a solid solution is also included in the range of metal oxides and compound oxides. Also, a material which has an oxo acid ion structure such as phosphate and silicate is also included in the range of metal oxides and compound oxides as far as the present invention is concerned.

Regarding the electrode material for a lithium ion secondary battery of the present invention, the diameter of the particle of the first active material is larger than the diameter of the particle of the composite. Therefore, a particle of conductive carbon and the second active material that form the composite naturally has a smaller diameter than the diameter of the particle of the first active material. It is preferable that the particle of the first active material has a diameter within the range of 100 nm to 100 μm, a particle of conductive carbon in the composite has a diameter within the range of 10 to 300 nm, and a particle of the second active material has a diameter within the range of 1 to 40 nm. This is because the advantageous effect of the present invention can be obtained within these ranges.

As for the electrode material for a lithium ion secondary battery of the present invention, an electrode material in which the second active material is a metal oxide can be suitably obtained by the method to make use of a reaction in the ultracentrifugal field described in Patent Document 2. Therefore, the present invention also relates to a method for producing an electrode material for a lithium ion secondary battery comprising: a particle of a first active material that can function as a positive electrode active material or a negative electrode active material of a lithium ion secondary battery; and a particle of a composite of conductive carbon and a second active material of a metal oxide attached to the conductive carbon that can function as an active material of the same electrode as the first active material, the particle of the first active material having a diameter larger than the particle of the composite, the particle of the composite filled in a gap formed between the particles of the first active material, wherein the method comprises:

1) a composite manufacturing process to prepare a particle of a composite of conductive carbon and a second active material of a metal oxide attached to the conductive carbon, which comprises:
   a) a preparation step to introduce into a rotatable reactor a reaction solution prepared by adding conductive carbon powder to a solution in which at least one compound of a metal that constitutes the metal oxide is dissolved;
   b) a supporting step to support the compound of a metal and/or its reaction product by the conductive carbon powder by turning the reactor to add shear stress and centrifugal force to the reaction solution; and
   c) a heat treatment step to transform the compound of a metal and/or its reaction product supported by the conductive carbon powder into a nanoparticle of oxide by heat-treating the conductive carbon powder supporting the compound of a metal and/or its reaction product, and 2) a kneading process to knead the particle of the composite obtained by the composite manufacturing process and a particle of a first active material with a diameter larger than the particle of the composite and to add pressure to the kneaded material obtained. A "nanoparticle" means a particle with the diameter of 1 to 200 nm, preferably 5 to 50 nm, and particularly preferably 10 to 40 nm. Also, the statement about the turning reactor and the description of the reaction using the turning reactor in Patent Document 2 is incorporated as they are into the present description by reference.

If the electrode material is manufactured by the aforementioned manufacturing method, the conductive agent can be comprised in the electrode material. In this case, a particle of the composite, a particle of the first active material and the conductive agent are kneaded in the kneading process.

If the electrode material of the present invention is used for a positive electrode and/or a negative electrode, a lithium ion secondary battery with high energy density is obtained. Therefore, the present invention also relates to a lithium ion secondary battery having a positive electrode and/or a negative electrode with an active material layer that comprises the electrode material of the present invention.

3. Advantageous Effects of the Invention

In the electrode material for a lithium ion secondary battery of the present invention, the minute particle of the composite, which is composed of the conductive carbon and the second active material attached to the conductive carbon that can serve as an active material of the same electrode as the first active material, fill the gap formed between the coarse particles of the first active material, and the energy density of the lithium ion secondary battery is improved by the active material in the composite filled in the gap.

Figure 1:
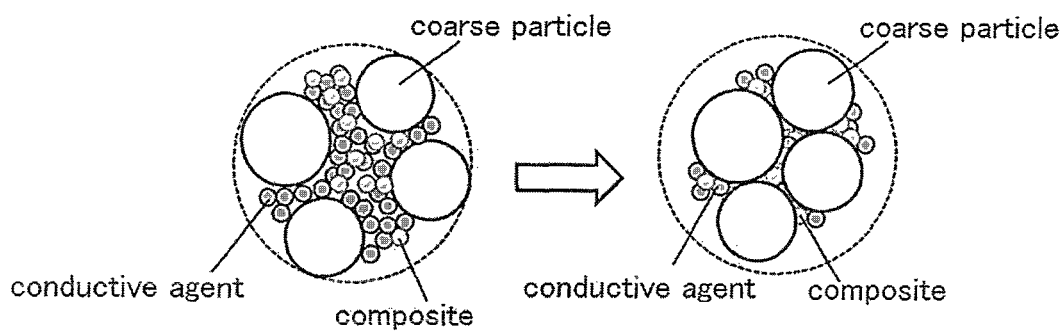
FIG. 1 shows schematic diagrams of an electrode material of the present invention.

DETAILED DESCRIPTION OF THE INVENTION (a) Electrode Material

An electrode material of the present invention comprises a particle of a first active material, which can serve as a positive electrode active material or a negative electrode active material of a lithium ion secondary battery, and a particle of a composite of conductive carbon and a second active material, which is attached to the conductive carbon and which can serve as an active material of the same electrode as the first active material. The diameter of the particle of the first active material is larger than the diameter of the particle of the composite, and the particle of the composite fills the gap formed between particles of the first active material.

A heretofore known positive electrode active material or a heretofore known negative electrode active material can be used without any restriction for the first active material or the second active material. The first active material and the second active material do not need to be the same compound. Generally, as the positive electrode active material, a substance that exhibits a voltage of 2.3 V or more against $Li/Li^+$ is used, and as a negative electrode active material, a substance that exhibits a voltage of less than 2.3 V against $Li/Li^+$ is used.

As the positive electrode active material, a $LiMO_2$ having a layered rock salt structure, a layered $Li_2MnO_3$—$LiMO_2$ solid solution, and a spinel-type $LiM_2O_4$ (M in the formulas is Mn, Fe, Co, Ni or a combination of thereof) are firstly exemplified. Specific examples of the positive electrode active material are $LiCoO_2$, $LiNiO_2$, $LiNi_{4/5}CO_{1/5}O_2$, $LiNi_{1/3}Co_{1/3}Mn_{1/3}O_2$, $LiNi_{1/2}Mn_{1/2}O_2$, $LiFeO_2$, $LiMnO_2$, $Li_2MnO_3$—$LiCoO_2$, $Li_2MnO_3$—$LiNiO_2$, $Li_2MnO_3$—$LiNi_{1/3}CO_{1/3}Mn_{1/3}O_2$, $Li_2MnO_3$—$LiNi_{1/2}Mn_{1/2}O_2$, $Li_2MnO_3$—$LiNi_{1/2}Mn_{1/2}O_2$—$LiNi_{1/3}Co_{1/3}Mn_{1/3}O_2$, $LiMn_2O_4$ and $LiMn_{3/2}Ni_{1/2}O_4$.

Other examples of the positive electrode active material are those containing sulfur, a sulfide such as $Li_2S$, $TiS_2$, $MoS_2$, $FeS_2$, $VS_2$ and $Cr_{1/2}V_{1/2}S_2$, a selenide such as $NbSe_3$, $VSe_2$, $NbSe_3$, oxides such as $Cr_2O_5$, $Cr_3O_8$, $VO_2$, $V_3O_8$, $V_2O_5$ and $V_6O_{13}$, as well as a compound oxide such as $LiNi_{0.8}CO_{0.15}Al_{0.05}O_2$, $LiVOPO_4$, $LiV_3O_5$, $LiV_3O_8$, $MoV_2O_8$, $Li_2FeSiO_4$, $Li_2MnSiO_4$, $LiFePO_4$, $LiFe_{1/2}Mn_{1/2}PO_4$, $LiMnPO_4$ and $Li_3V_2(PO_4)_3$.

Examples of the negative electrode active material are oxides such as $Fe_2O_3$, MnO, $MnO_2$, $Mn_2O_3$, $Mn_3O_4$, COO, $Co_3O_4$, NiO, $Ni_2O_3$, TiO, $TiO_2$, SnO, $SnO_2$, $SiO_2$, $RuO_2$, WO, $WO_2$ and ZnO, metals such as Sn, Si, Al and Zn, compound oxides such as $LiVO_2$, $Li_3VO_4$ and $Li_4Ti_5O_{12}$, and a nitride such as $Li_{2.6}Co_{0.4}N$, $Ge_3N_4$, $Zn_3N_2$ and $Cu_3N$.

These positive electrode active materials or negative electrode active materials form a coarse particle when they are used as the first active material and they form a composite with conductive carbon when they are used as the second active material. The first active material can be a single compound or a mixture of two or more compounds. The second active material can also be a single compound or a mixture of two or more compounds.

Many of the coarse particles of the first active material that can be used are commercially available; for example, $LiFePO_4$ (manufacturer: Clariant (Japan) K.K., trade name: Life Power, registered trademark: P2), $LiNi_{0.5}Co_{0.2}Mn_{0.3}O_2$ (manufacturer: BASF, trade name: HED NCM-523), $LiCoO_2$ (manufacturer: Nippon Chemical Industries Co., Ltd, trade name: CELLSEED C-5H) and $LiNi_{0.8}Co_{0.15}Al_{0.05}O_2$ (manufacturer: ECOPRO, trade name: NCAO2O). Also, these can be obtained by a heretofore known manufacturing method. For example, a compound oxide can be obtained by mixing raw materials containing each metal constituting the compound oxide and heat-treating the mixed raw materials. The diameter of the coarse particle is preferably within the range of 100 nm to 100 μm, more preferably 1 to 80 μm, and especially preferably 10 to 50 μm.

For the powdered carbon which constitutes the composite, any conductive carbon can be used without restriction. Examples are carbon black such as Ketjen Black, acetylene black and channel black, fullerene, carbon nanotube, carbon nanofiber, amorphous carbon, carbon fiber, natural graphite, artificial graphite, graphitized Ketjen Black, activated carbon, and mesoporous carbon. Also, a vapor grown carbon fiber can be used. These carbon powders can be used alone or two or more kinds can be used after mixing. It is preferable that at least a part of the carbon powder is carbon nanofiber because a high conductive composite can be obtained. The diameter of the conductive carbon is preferably within the range of 10 to 300 nm, more preferably 10 to 100 nm, and especially preferably 10 to 50 nm.

The second active material to form the composite is generally a nanoparticle, preferably with a diameter within the range of 1 to 40 nm.

The method for preparing the composite does not have any restriction as long as it is a method to obtain a composite particle with a diameter smaller than that of a coarse particle of the first active material. For example, the composite can be obtained by a method in which, after a commercially available positive electrode active material or a commercially available negative electrode active material is strongly pulverized or a nanoparticle of an active material is manufactured by a reaction such as hydrothermal reaction, the pulverized material or the nanoparticle is mixed with conductive carbon powder and dispersion medium, and then kneaded under centrifugal force (solid-phase mechanochemical reaction).

If the second active material is a metal oxide, the composite can be suitably obtained by a method to utilize the reaction in an ultracentrifugal field as shown in Patent Document 2 (JP 2007-160151 A).

The preparation of a composite using the reaction in the ultracentrifugal field is carried out by a process comprising:
a) a preparation step to introduce into a rotatable reactor a reaction solution prepared by adding conductive carbon powder to a solution in which at least one compound of a metal that constitutes the metal oxide is dissolved;
b) a supporting step to support the compound of a metal and/or its reaction product by the conductive carbon powder by turning the reactor to add shear stress and centrifugal force to the reaction solution; and
c) a heat treatment step to transform the compound of a metal and/or its reaction product supported by the conductive carbon powder into a nanoparticle of oxide by heat-treating the conductive carbon powder supporting the compound of a metal and/or its reaction product.

In the preparation step, a reaction solution is obtained by adding a chemical compound containing a target metal (hereinafter referred to as a "metal oxide raw material") and conductive carbon powder to a solvent and dissolving the metal oxide raw material into the solvent.

As the solvent, any liquid that does not adversely affect the reaction can be used without any restriction, and water, methanol, ethanol, and isopropyl alcohol, among others, can be suitably used. Two or more solvents can be mixed and used.

As the metal oxide raw material, a compound that can be dissolved in the solvent can be used without any restriction. For example, an inorganic metallic salt of the metal such as halide, nitrate, sulfate and carbonate, an organic metallic salt of the metal such as formate, acetate, oxalate, methoxide, ethoxide and isopropoxide, or a mixture of these can be used. These compounds can be used alone or used as a mixture of two or more kinds. Compounds containing different metals can be mixed at a given quantity and used.

A reaction inhibitor or a reaction accelerator can be added into the reaction solution to get the target reaction product supported by conductive carbon in the following supporting step. For example, when the second active material is $Li_4Ti_5O_{12}$ and a solution in which titanium alkoxide and lithium acetate as metal oxide raw materials are added to a mixed solvent of isopropanol and water is used as the reaction solution, $Li_4Ti_5O_{12}$ is sometimes not obtained because the hydrolysis and polycondensation reaction of titanium alkoxide are too fast, but by adding an inhibitor such as acetic acid, citric acid, oxalic acid, formic acid and lactic acid to the reaction solution in order to form a complex with titanium alkoxide, and delaying the hydrolysis and polycondensation reaction of titanium alkoxide, $Li_4Ti_5O_{12}$ can be obtained. Also, for example, when the second active material is $SnO_2$ and a solution in which tin chloride is dissolved in water is used as the reaction solution, the hydrolysis and polycondensation reaction (sol-gel reaction) of tin chloride is slow and the supporting efficiency of polycondensation reaction product by conductive carbon is low in some cases, but by adding a reaction accelerator such as NaOH, KOH, $Na_2CO_3$, $NaHCO_3$ and $NH_4OH$ to the solution in order to accelerate the reaction, the supporting efficiency of the polycondensation reaction product by conductive carbon can be improved.

Further, if the composite is a composite of conductive carbon and a metal oxide attached to the conductive carbon which contains a transition metal selected from a group consisting of Mn, Fe, Co and Ni, it is preferable to use the reaction solution that contains water, at least one compound containing the transition metal and conductive carbon powder, and set the pH of the reaction solution within the range of 9 to 11. By this method, a nanoparticle of hydroxide of the transition metal is efficiently supported by the conductive carbon powder in the supporting step described below.

As the compound containing a transition metal selected from a group consisting of Mn, Fe, Co and Ni, water-soluble compounds can be used without any restriction. For example, an inorganic metallic salt of the transition metal such as halide, nitrate and sulfate, an organic metal salt of the transition metal such as formate and acetate, or a mixture of these can be used. These compounds can be used alone or used as a mixture of two or more kinds. Compounds containing different transition metals can be mixed at a given quantity and used.

It is preferable to perform the adjustment of the pH of this reaction solution with an aqueous solution in which the hydroxide of Li is dissolved. Further, an aqueous solution of lithium oxide, ammonia and amines can be used. For the adjustment of pH, a single compound can be used or a mixture of two or more compounds can also be used.

This reaction solution can be easily prepared by mixing a solution in which the hydroxide of Li is dissolved in water and a solution in which the conductive carbon powder and the water-soluble salt of the transition metal are added to water and the water-soluble salt is dissolved. Here, the pH of the reaction solution is adjusted within the range of 9 to 11. If the pH is 9 or less, the supporting efficiency of hydroxide by the conductive carbon powder in the following supporting step is low, while if the pH is more than 11, it is difficult to obtain fine hydroxide because the insolubilization speed of hydroxide in the supporting step is too fast.

As the turning reactor, reactors that can apply ultracentrifugal force to the reaction solution can be used without any restriction, but the reactor described in FIG. 1 of Patent Document 2 (JP 2007-160151 A), which comprises concentric cylinders comprising an external cylinder and an internal cylinder, where through-holes are created on the side face of the rotatable internal cylinder and where a shuttering board is placed on the open end of the external cylinder, is suitably used. Examples of utilizing this suitable reactor will be explained below.

A reaction solution for a reaction in the ultracentrifugal field is introduced into the internal cylinder of the aforementioned reactor. The reaction solution that has been prepared in advance may be introduced into the internal cylinder or may be introduced by preparing the reaction solution in the internal cylinder. It is preferable to put solvent, conductive carbon powder and metal oxide raw material in the internal cylinder, turn the internal cylinder and dissolve the metal oxide raw material into the solvent and concurrently disperse the conductive carbon powder into the solution, and thereafter, suspend the turning of the internal cylinder, introduce a reaction accelerator or a pH adjusting solution and then turn the internal cylinder again. This is because the dispersion of the conductive carbon powder becomes excellent by the first turning and as a result, the dispersion of a metal oxide nanoparticle supported by the conductive carbon powder becomes excellent.

In the supporting step, the metal oxide raw material and/or its reaction product are supported by the conductive carbon powder by turning the reactor to add shear stress and centrifugal force to the reaction solution. Depending on the kind of reaction solution, the metal oxide raw material may be supported or a sol-gel reaction product may be supported. When the reaction solution containing water, a metal oxide raw material containing a transition metal selected from a group consisting of Mn, Fe, Co and Ni, and conductive carbon, and having a pH within the range of 9 to 11 is used, in the supporting step, a core of a hydroxide is formed, and the core of the hydroxide produced and the conductive carbon powder are dispersed, and simultaneously, the hydroxide of transition metal is supported by the conductive carbon powder.

It is considered that transformation from a metal oxide raw material to a reaction product and support of a metal oxide raw material and/or its reaction product by conductive carbon powder is realized by the mechanical energy of shear stress and centrifugal force that are added to a reaction solution. The shear stress and centrifugal force are produced by centrifugal force that is added to the reaction solution by turning the reactor. The centrifugal force added to the reaction solution is the kind of centrifugal force generally referred to as "ultracentrifugal force", which is generally 1500 $kgms^{-2}$ or more, preferably 70000 $kgms^{-2}$ or more, and especially preferably 270000 $kgms^{-2}$ or more.

By way of explanation, in the aforementioned suitable reactor having the external cylinder and internal cylinder, when the inner cylinder of the reactor in which a reaction solution is introduced is rotated, the reaction solution within the internal cylinder moves to the external cylinder via the through-holes and the reaction solution between the outer wall surface of the internal cylinder and the inner wall surface of the external cylinder slides up to the upper part of the inner wall of the external cylinder by the centrifugal force produced by the turning of the internal cylinder. As a result, shear stress and centrifugal force are added to the reaction solution, and by this mechanical energy, conversion from a metal oxide raw material to a reaction product and support of the metal oxide raw material and/or its reaction product by conductive carbon powder occur between the outer wall surface of the internal cylinder and the inner wall surface of the external cylinder depending on the kind of reaction solution. The metal oxide raw material and/or its reaction product are supported as a highly fine particle by the conductive carbon powder with good dispersibility by this reaction in the ultracentrifugal field.

In the reaction, it is preferable that the gap between the outer wall surface of the internal cylinder and the inner wall surface of the external cylinder is narrower because greater mechanical energy can be added to the reaction solution. The gap between the outer wall surface of the internal cylinder and the inner wall surface of the external cylinder is preferably 5 mm or less, more preferably 2.5 mm or less, and especially preferably 1.0 mm or less. The gap between the outer wall surface of the internal cylinder and the inner wall surface of the external cylinder can be set based on the width of the shuttering board of the reactor and the quantity of the reaction solution that is introduced into the reactor.

There is no strict restriction on the turning time of the internal cylinder; the time can change according to the quantity of reaction solution or turning speed (the value of centrifugal force) of the internal cylinder, but is generally within the range of 0.5 to 10 minutes. After the reaction ends, the turning of the internal cylinder is stopped and the conductive carbon powder supporting the metal oxide raw material and/or its reaction product is retrieved.

In the heat treatment step, the recovered product is washed as needed, and by heat-treating it, the metal oxide raw material and/or its reaction product supported by the conductive carbon powder is converted into a nanoparticle of an oxide.

There is no strict restriction on the atmosphere of the heat treatment provided that the target metal oxide is obtained. Heat treatment can be done in a vacuum, in an inert atmosphere such as nitrogen and argon, or in an atmosphere containing oxygen such as oxygen and air. Also, there is no restriction on the temperature and duration of the heat treatment; this can change according to the composition of the target oxide and the quantity of preparation, but is generally within the range of 10 minutes to 10 hours at a temperature between 200 to 300° C. in the case of heat treatment in an atmosphere containing oxygen, within the range of 10 minutes to 10 hours at a temperature between 250 to 900° C. in the case of heat treatment in an inert atmosphere, and within the range of 10 minutes to 10 hours at a temperature between room temperature to 200° C. in the case of heat treatment in a vacuum atmosphere. Because the metal oxide raw material and/or its reaction product are supported as a fine particle by conductive carbon powder with good dispersibility in the course of the supporting step, the metal oxide formed in the heat treatment step becomes a fine and even-sized particle, or more specifically, a nanoparticle. The qualities of the nanoparticle are dependent on various conditions including the composition of the reaction solution in the preparation step, the turning speed of the reactor in the supporting step, and the heating atmosphere in the heat treatment step. Depending the conditions, a highly fine particle with a diameter in the order of 1 nm, which is supported by conductive carbon powder in a highly dispersed state, may be formed, or a particle with a diameter in the order of 10 nm, which is attached to conductive carbon with good dispersibility, may be formed.

If a composite composed of conductive carbon and a nanoparticle of a compound oxide selected from a $LiMO_2$ having a layered rock salt type structure, a layered $Li_2MnO_3$—$LiMO_2$ solid solution and a spinel-type $LiM_2O_4$ (M in the formula is Mn, Fe, Co, Ni or a combination of these) is intended to be obtained, it can be obtained by washing as needed the conductive carbon powder supporting a hydroxide of a transition metal selected from a group consisting of Mn, Fe, Co and Ni, which was obtained in the supporting step and mixing it with a compound of Li before the heat treatment step, and then heat-treating the mixture. The hydroxide of Mn etc. supported by the conductive carbon powder and the compound of Li are reacted and transformed into a nanoparticle, especially a nanoparticle with an initial particle diameter of 10 to 40 nm, of the aforementioned compound oxide.

As the compound of Li, a compound including Li may be used without any restriction. For example, an inorganic metallic salt of Li such as hydroxide, carbonate, halide, nitrate and sulfate, an organic metallic salt of Li such as formate, acetate, oxalate and lactate, or a mixture of these can be used. These compounds can be used alone or used as a mixture of two or more kinds. It is preferable to use hydroxide because impurities such as a sulfur compound or a nitrogen compound do not remain behind and a compound oxide can be obtained rapidly.

By combining the conductive carbon powder supporting a fine particle of hydroxide of Mn etc. obtained in the supporting step and a compound of Li with an adequate quantity of dispersion medium as needed, and kneading them while evaporating the dispersion medium as needed, a kneaded material is obtained. As the dispersion medium for kneading, a medium that does not adversely affect the composite can be used without any restriction; water, methanol, ethanol, and isopropyl alcohol, among others, can be suitably used, and water is especially suitably used.

Also in this case, there is no restriction on the atmosphere of the heat treatment. Heat treatment can be done in a vacuum, in an inert atmosphere such as nitrogen and argon, or in an atmosphere containing oxygen such as oxygen and air. Also, there is no restriction on the temperature and duration of the heat treatment; this can change according to the composition of the target oxide and the quantity of preparation, but is generally within the range of 10 minutes to 10 hours at a temperature between 200 to 300° C. in the case of heat treatment in an atmosphere containing oxygen, within the range of 10 minutes to 10 hours at a temperature between 250 to 600° C. in the case of heat treatment in an inert atmosphere, and within the range of 10 minutes to 10 hours at a temperature between room temperature to approximately 200° C. in the case of heat treatment in a vacuum atmosphere.

It is preferable to perform heat treatment in this case at a temperature of 200 to 300° C. in an atmosphere containing oxygen. This is because conductive carbon powder is not destroyed by burning even in an atmosphere containing oxygen if the temperature is 300° C. or less and a compound oxide can be obtained with good crystalline structure. If heat treatment is given in an atmosphere that does not contain oxygen, the compound oxide may be reduced and the target compound oxide may not be obtained.

Because the conductive carbon powder obtained in the course of the supporting step, in which hydroxide is supported as an even-sized fine particle, is used, the reaction between a hydroxide of Mn, etc and an Li compound proceeds in a rapid and even manner, and the nanoparticle of a compound oxide obtained is also fine and has an even size.

In the heat treatment step, if a LiMO$_2$ having a layered rock salt structure or a layered Li$_2$MnO$_3$—LiMO$_2$ solid solution is intended to be obtained, a spinel may be simultaneously formed in some cases. In such cases, it is preferable to give hydrothermal treatment after the aforementioned heat treatment, preferably heat treatment at 200 to 300° C. in an atmosphere containing oxygen. Then, the spinel is denatured into a layered structure by the hydrothermal treatment and a layered structure with high purity can be obtained. The hydrothermal treatment can be carried out under high temperature hot water at a temperature of 100° C. or more and at an atmospheric pressure of 1 bar or more after the powder after the heat treatment and water, preferably a lithium hydroxide aqueous solution are introduced into an autoclave.

If the minute particle of the composite with relatively high conductivity and the coarse particle of the first active material that has a diameter larger than the diameter of the composite are added to a solvent in which a binder is dissolved as needed, and kneaded, the kneaded material obtained is coated on a collector for a positive electrode or a negative electrode and dried as needed and then rolling treatment is given to the coating film, the coarse particles draw near to each other and contact each other, the minute particles of the composite are pushed out and be filled in a gap that is formed between adjacent coarse particles (FIG. 1 right) and the electrode material of the present invention is obtained. Most of the particles of the composite exist in the gap surrounded by multiple coarse particles that exist in a state of contact with each other. The conductive carbon and the particle of the second active material attached to the conductive carbon, which compose the composite, exist integrally and do not separate through the aforementioned processes of from kneading to rolling. It is preferable that the mixture ratio of the minute particle and the coarse particle is within the range of the mass ratio of 5 to 30:95 to 70. When the range is exceeded, the energy density of the electrode material obtained tends to decrease. The binder and solvent used at the time of kneading, and the collector for a positive electrode or a negative electrode will be explained in the following description for a lithium ion secondary battery.

Then, by simultaneously kneading a conductive agent composed of conductive carbon, an electrode material having a relatively high conductivity in which both the minute particle of the composite and the conductive agent fill the gap formed between adjacent coarse particles (FIG. 1 right), is obtained. It is preferable that the conductivity of the mixture of the composite and the conductive agent is $10^{-3}$ s/cm or more.

As the conductive agent composed of conductive carbon, any conductive carbon can be used without restriction. Examples are carbon black such as Ketjen Black, acetylene black and channel black, fullerene, carbon nanotube, carbon nanofiber, amorphous carbon, carbon fiber, natural graphite, artificial graphite, graphitized Ketjen Black, activated carbon, and mesoporous carbon. Also, a vapor grown carbon fiber can be used. The carbon powder can be used alone, or as a mixture of two or more kinds. As with the composite, a particle of conductive carbon used as the conductive agent also has a diameter smaller than the diameter of the coarse particle of the first active material. The diameter of the conductive carbon is preferably within the range of 10 to 300 nm, more preferably 10 to 100 nm, and especially preferably 10 to 50 nm.

(b) Lithium Ion Secondary Battery

The electrode material of the present invention is suitable for a lithium ion secondary battery. Therefore, the present invention also provides a lithium ion secondary battery with a positive electrode and/or a negative electrode that has an active material layer comprising the electrode material of the present invention and with a separator holding a nonaqueous electrolytic solution placed between the negative electrode and the positive electrode.

The active material layer for a positive electrode can be obtained by adding the abovementioned minute particle of a composite including a positive electrode active material and a coarse particle of a positive electrode active material to a solvent in which a binder is dissolved as needed and kneading it sufficiently, and coating the kneaded material obtained on a collector for the positive electrode by the doctor blade method or the like, drying the coating film as needed, and giving rolling treatment to the coating film. It is also possible to form the kneaded material obtained into a given shape, fix it on the collector by applying pressure, and give rolling treatment to it.

Similarly, the active material layer for a negative electrode can be obtained by adding the abovementioned minute particle of a composite including a negative electrode active material and a coarse particle of a negative electrode active material to a solvent in which a binder is dissolved as needed and kneading it sufficiently, and coating the kneaded material obtained on a collector for the negative electrode by the doctor blade method or the like, drying the coating film as needed, and giving rolling treatment to the coating film. It is also possible to form the kneaded material obtained into a given shape, fix it on the collector by applying pressure, and give rolling treatment to it.

Either a positive electrode or a negative electrode can be formed with an electrode material other than the electrode material of the present invention, for example, a composite material that contains conductive carbon and a particle of an active material with a relatively large particle diameter and that does not contain a minute particle of a composite.

As the collector, an electroconductive material such as platinum, gold, nickel, aluminum, titanium, steel or carbon can be used. As for the form of the collector, any form such as film, foil, plate, mesh, expanded metal, or cylinder can be adopted.

As the binder, a heretofore known binder such as polytetrafluoroethylene, polyvinylidene fluoride, tetrafluoroethylene-hexafluoropropylene copolymer, polyvinyl fluoride, and carboxymethylcellulose is used. It is preferable that the contained amount of the binder is 1 to 30% by mass of the total amount of the mixed material. Inconvenience occurs if the contained amount of the binder is 1% by mass or less because the strength of the active material layer is insufficient, while if it is 30% by mass or more, the discharge capacity of the negative electrode decreases and its internal resistance becomes excessive.

As the separator, polyolefin fiber nonwoven fabric or glass fiber nonwoven fabric can, for example, be suitably used. As for an electrolytic solution that is held in the separator, an electrolytic solution in which an electrolyte is dissolved into a nonaqueous solvent is used, and a heretofore known nonaqueous electrolytic solution can be used without any restriction.

As the solvent of the nonaqueous electrolytic solution, electrochemically stable ethylene carbonate, propylene carbonate, butylene carbonate, dimethylcarbonate, ethyl methyl carbonate, diethyl carbonate, sulfolane, 3-methyl sulfolane, γ-butyrolactone, acetonitrile and dimethoxyethane, N-methyl-2-pyrrolidone, dimethyl formamide or a mixture of these can be suitably used.

As the solute of the nonaqueous electrolytic solution, a salt that produces a lithium ion when it is dissolved into an organic electrolyte can be used without any restriction. For example, $LiPF_6$, $LiBF_4$, $LiClO_4$, $LiN(CF_3SO_2)_2$, $LiCF_3SO_3$, $LiC(SO_2CF_3)_3$, $LiN(SO_2C_2F_5)_2$, $LiAsF_6$, or $LiSbF_6$, or a mixture of these can be suitably used. As the solute of the nonaqueous electrolytic solution, a quaternary ammonium salt or a quaternary phosphonium salt that has a quaternary ammonium cation or a quaternary phosphonium cation can be used in addition to a salt that forms a lithium ion. For example, a salt composed of a cation represented by $R^1R^2R^3R^4N^+$ or $R^1R^2R^3R^4P^+$ ($R^1$, $R^2$, $R^3$, $R^4$ represent an alkyl group having 1 to 6 carbons) and an anion of $PF_6^-$, $BF_4^-$, $ClO_4^-$, $N(CF_3SO_3)_2^-$, $CF_3SO_3^-$, $C(SO_2CF_3)_3^-$, $N(SO_2C_2F_5)_2^-$, $AsF_6^-$ or $SbF_6^-$ or a mixture of these can be suitably used.

EXAMPLES

The examples of the present invention are shown as follows, but the present invention is not limited to the following examples.

(I) Evaluation of the Filled State

Example 1

A reactor shown in FIG. 1 of Patent Document 2 (JP 2007-160151 A), which comprises concentric cylinders of an external cylinder and an internal cylinder, has through-holes on the side face of the internal cylinder, and has a shuttering board on the open end of the external cylinder, is used. A fluid in which 2.49 g of $Co(CH_3COO)_2 \cdot 4H_2O$ and 0.225 g of Ketjen Black (diameter: approximately 40 nm) were added to 75 mL of water was introduced into the internal cylinder, and the internal cylinder was turned for 300 seconds to add centrifugal force of 70000 $kgms^{-2}$ to the reaction solution so that $Co(CH_3COO)_2 \cdot 4H_2O$ was dissolved and Ketjen Black was dispersed. Next, the turning of the internal cylinder was suspended and fluid in which 0.8 g of $LiOH \cdot H_2O$ was dissolved into water was added into the internal cylinder. Then, the internal cylinder was turned again for 300 seconds to add centrifugal force of 70000 $kgms^{-2}$ to the reaction solution. In the meantime, a core of Co hydroxide was formed between the inner wall of the external cylinder and the outer wall of the internal cylinder, the core grew and was supported on the surface of Ketjen Black. After the turning of the internal cylinder was stopped, Ketjen Black was filtered and retrieved, and then dried for 12 hours in air at the temperature of 100° C. When the filtrate was inspected by ICP spectrometry, it was found that 95% or more of Co contained in the raw material $Co(CH_3COO)_2 \cdot 4H_2O$ was supported. Then, the powder after drying and an aqueous solution that contained $LiOH \cdot H_2O$ in an amount that made the ratio of Co:Li 1:1 were mixed and kneaded, and after drying, the kneaded material was given heat-treatment for 1 hour in air at the temperature of 250° C. Further, a composite was obtained by introducing the powder after heat treatment and 6M/L LiOH aqueous solution into an autoclave and giving hydrothermal treatment for six hours in saturated vapor at the temperature of 250° C. In this composite, an initial particle of $LiCoO_2$ with a diameter within the range of 10 to 200 nm was formed with good dispersibility. A TG evaluation was performed on this composite at the temperature raising rate of 1° C./minute within the range of room temperature to 650° C. in an air atmosphere. When the weight reduction amount was estimated as carbon, the mass ratio of $LiCoO_2$ and carbon (Ketjen Black) in the composite was 90:10.

Then, commercially available $LiCoO_2$ (average primary diameter: approximately 10 μm) as a coarse particle and the composite obtained were mixed at the mass ratio of 100−X:X and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that an electrode for electrode density evaluation was obtained. The rolling treatment shown in all of the following Examples and Comparative Examples was given under the same condition. Further, the $LiCoO_2$ coarse particle, the composite and acetylene black were mixed at the mass ratio of 90:10:2 and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment, and then ion milling was performed on the cross-section so that an electrode for SEM observation was obtained.

Comparative Example 1

The commercially available $LiCoO_2$ (average primary diameter: approximately 10 μm) in Example 1 was used as a coarse particle, which was mixed with acetylene black at the ratio of 100−Y:Y, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that an electrode for electrode density evaluation was obtained. Further, the $LiCoO_2$ coarse particle and acetylene black were mixed at the mass ratio of 97:3 and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment, and then ion milling was performed on the cross-section so that an electrode for SEM observation was obtained.

Figure 2:
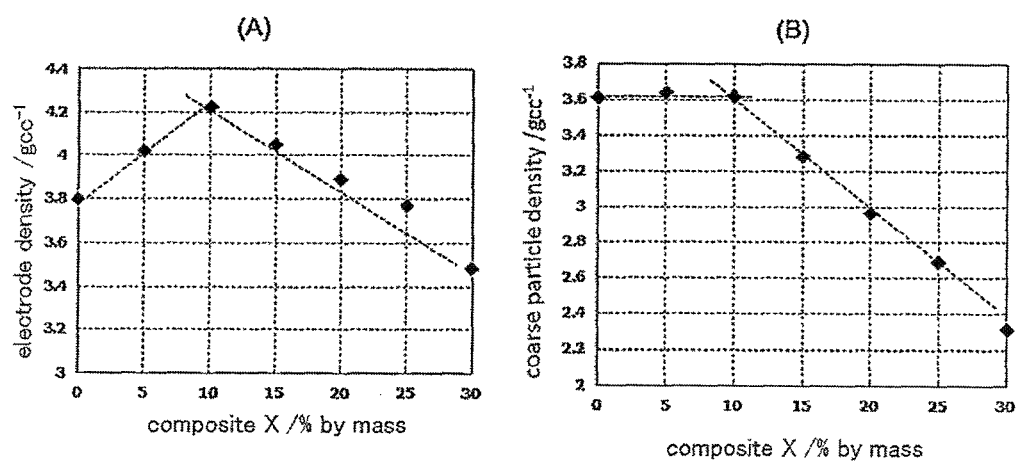
FIG. 2 shows the relationship between electrode density and the quantity of a composite in an electrode material containing a $LiCoO_2$ coarse particle and the composite having a $LiCoO_2$ nanoparticle; (A) shows the relationship with the density of the whole electrode and (B) shows the relationship with the density of the coarse particle.

FIG. 2 shows the relationship between the quantity of the composite X and electrode density in the electrode of Example 1. FIG. 2(A) shows the relationship between the quantity of the composite X and the electrode density calculated by the measured value of the volume and weight of the electrode material on the aluminum foil, while (B) shows the relationship between the quantity of the composite X and the coarse particle density (the weight of a coarse particle in electrode 1 cc), which is calculated by the electrode density obtained and the following formula.

$$\text{a coarse particle density} = \text{the electrode density} \times \{(100-X)/100\} \times 0.95$$

Figure 3:
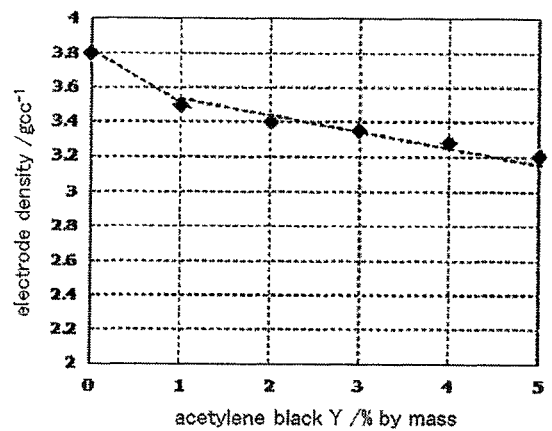
FIG. 3 shows the relationship between electrode density and the quantity of acetylene black in an electrode material containing a $LiCoO_2$ coarse particle and acetylene black.

FIG. 3 shows the relationship between the quantity of acetylene black Y and the electrode density calculated by the measured value of the volume and weight of the electrode material on the aluminum foil in the electrode of Comparative Example 1.

As is obvious from FIG. 3, in Comparative Example 1, even though the amount of acetylene black in the electrode material was as small as 1% by mass, electrode density sharply decreased, and as the contained amount of acetylene black further increased, the electrode density gradually decreased. Therefore, it was found that it is difficult for acetylene black to enter the gap that is formed between the $LiCoO_2$ coarse particles, and therefore this increases the gap between adjacent $LiCoO_2$ coarse particles. On the other hand, in Example 1, where the electrode material of the present invention is used, as is obvious from FIG. 2(A), electrode density increased as the contained amount of the composite increased until the composite became 10% by mass, and when the contained amount of the composite further increased, electrode density decreased. As for the coarse particle density of $LiCoO_2$, as is obvious from FIG. 2(B), until the composite became 10% by mass, it showed approximately the same value as the coarse particle density of an electrode material that is only composed of a $LiCoO_2$ coarse particle. This shows that the composite filled the gaps surrounded by multiple $LiCoO_2$ coarse particles that exist in a state of contact with each other until the composite became 10% by mass.

Figure 4:
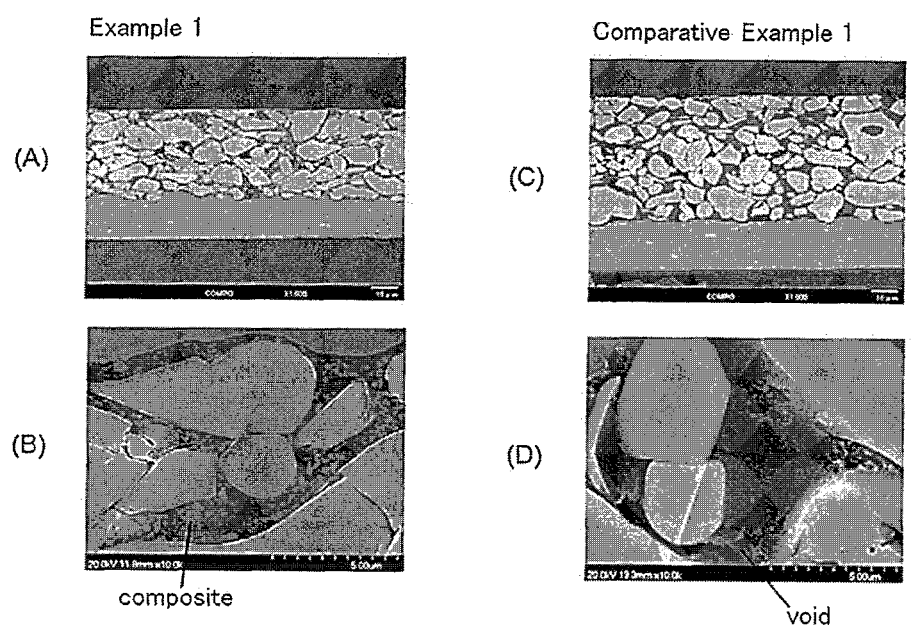
FIG. 4 shows SEM images of the cross-sections of electrodes; (A) is an SEM image of an electrode obtained from an electrode material containing a $LiCoO_2$ coarse particle and a composite having a $LiCoO_2$ nanoparticle, (B) is a high-power SEM image of (A), (C) is an SEM image of an electrode obtained from an electrode material containing a $LiCoO_2$ coarse particle and acetylene black, and (D) is a high-power SEM image of (C).

FIG. 4 shows the SEM images (A) (B) of the electrode material in Example 1 and the SEM images (C) (D) of the electrode material in Comparative Example 1, where (B) is a high-magnification image of (A) and (D) is a high-magnification image of (C). As is obvious from FIG. 4, in the case of the electrode material in Example 1, the $LiCoO_2$ coarse particles came close to each other and the composite particles densely filled the gaps between the $LiCoO_2$ coarse particles. On the other hand, in the case of the electrode material of Comparative Example 1, when compared with the electrode material of Example 1, the electrode material was thicker and the gap between the $LiCoO_2$ coarse particles was wider, though produced under the same condition in terms of rolling treatment. Moreover, a void was found in acetylene black, which existed in the gap between the $LiCoO_2$ coarse particles. This result shows that the composite suitably filled the gaps surrounded by the coarse particles in the electrode material of the present invention.

Example 2

Fluid in which 1.98 g of Fe $(CH_3COO)_2$, 0.77 g of $CH_3COOLi$, 1.10 g of $C_6H_8O_7 \cdot H_2O$, 1.32 g of $CH_3COOH$, 1.31 g of $H_3PO_4$ and 0.50 g of Ketjen Black were added to 120 mL of water was introduced to the internal cylinder of the reactor used in Example 1, the internal cylinder was turned for 300 seconds so that the centrifugal force of 70000 $kgms^{-2}$ was added to the reaction solution, Ketjen Black was dispersed and the reaction product was made supported on the surface of Ketjen Black. After the turning of the internal cylinder was suspended, the content of the reactor was retrieved, dried and solidified by means of evaporation in air at 100° C. Then, it was heat-treated for 3 minutes in nitrogen at 700° C. and a composite was obtained. In this composite, an initial particle of $LiFePO_4$ with a diameter in the range of 20 to 50 nm was formed with good dispersibility. A TG evaluation was performed on this composite in an air atmosphere at a temperature within a range between room temperature and 650° C. at the temperature raising rate of 1° C./minute. When the amount of weight loss was estimated as carbon, the mass ratio of $LiFePO_4$ and carbon (Ketjen Black) in the composite was 81:19.

Then, commercially available $LiFePO_4$ (initial particle diameter: 0.5 to 1 μm, secondary particle size: approximately 2 to 3 μm) as a coarse particle and the composite obtained were mixed at the mass ratio of 100−X:X, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that an electrode for electrode density evaluation was obtained.

Comparative Example 2

The commercially available $LiFePO_4$ (initial particle diameter: 0.5 to 1 μm, secondary particle size: approximately 2 to 3 μm) in Example 1 was used as a coarse particle, which was mixed with acetylene black at the ratio of 100−Y:Y, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that an electrode for electrode density evaluation was obtained.

Figure 5:
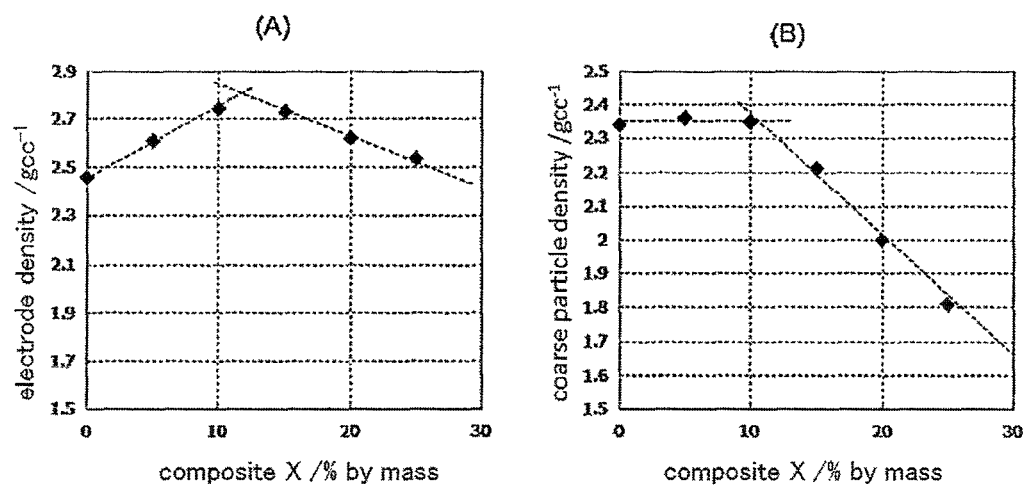
FIG. 5 shows the relationship between electrode density and the quantity of a composite in an electrode material containing a $LiFePO_4$ coarse particle and the composite having a $LiFePO_4$ nanoparticle; (A) shows the relationship with the density of the whole electrode and (B) shows the relationship with the density of the coarse particle.

FIG. 5 shows the relationship between the quantity of the composite X and electrode density in the electrode of Example 2. FIG. 5(A) shows the relationship between the quantity of the composite X and the electrode density calculated by the measured value of the volume and weight of the electrode material on the aluminum foil, while (B) shows the relationship between the quantity of the composite X and the coarse particle density (the weight of a coarse particle in electrode 1 cc), which is calculated by the electrode density obtained and the following formula.

a coarse particle density=the electrode density×{(100−X)/100}×0.95

Figure 6:
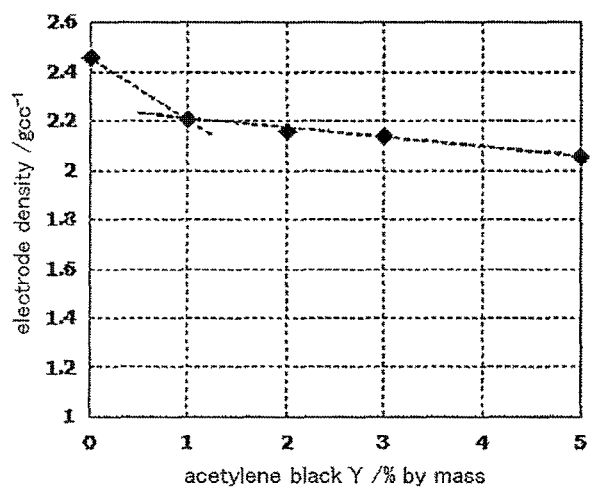
FIG. 6 shows the relationship between electrode density and the quantity of acetylene black in an electrode material containing a $LiFePO_4$ coarse particle and acetylene black.

FIG. 6 shows the relationship between the quantity of acetylene black Y and the electrode density calculated by the measured value of the volume and weight of the electrode material on the aluminum foil in the electrode of Comparative Example 2.

As is obvious from FIG. 6, in Comparative Example 2, even though the amount of acetylene black in the electrode material was as small as 1% by mass, electrode density sharply decreased, and as the contained amount of acetylene black further increased, the electrode density gradually decreased. Therefore, it was found that it is difficult for acetylene black to enter the gap that is formed between the $LiFeO_4$ coarse particles, and therefore this increases the gap between adjacent $LiFeO_4$ coarse particles. On the other hand, in Example 2, where the electrode material of the present invention is used, as is obvious from FIG. 5(A), electrode density increased as the contained amount of the composite increased until the composite became 10% by mass, and when the contained amount of the composite further increased, electrode density decreased. As for the coarse particle density of $LiFeO_4$, as is obvious from FIG. 5(B), until the composite became 10 mass %, it showed approximately the same value as the coarse particle density of an electrode material that is only composed of a $LiFeO_4$ coarse particle. This shows that the composite filled the gaps surrounded by multiple $LiFeO_4$ coarse particles that exist in a state of contact with each other until the composite became 10% by mass. This result shows that the composite suitably filled the gaps surrounded by the coarse particles in the electrode material of the present invention.

(II) Lithium Ion Secondary Battery

1) Electrode Materials Comprising a Coarse Particle of $LiMn_2O_4$ and a Composite of $LiMn_2O_4$ (Spinel) and Conductive Carbon, and Usage of the Electrode Materials Example 3

Fluid in which 2.45 g of $Mn(CH_3COO)_2 \cdot 4H_2O$ and 0.225 g of carbon mixture consisting of Ketjen Black (diameter:

approximately 40 nm) and carbon nanofiber (diameter: approximately 20 nm, length: several hundred nm) at the mass ratio of 1:1 were added to 75 mL of water was introduced into the internal cylinder of the reactor used in Example 1 and the internal cylinder was turned for 300 seconds to add centrifugal force of 70000 kgms$^{-2}$ to the reaction solution so that Mn(CH$_3$COO)$_2$.4H$_2$O was dissolved and the carbon mixture was dispersed. Next, the turning of the internal cylinder was suspended and fluid in which 0.6 g of LiOH.H$_2$O was dissolved into water was added into the internal cylinder. The pH of the fluid was 10. Then, the internal cylinder was turned again for 300 seconds to add centrifugal force of 70000 kgms$^{-2}$ to the reaction solution. In the meantime, a core of Mn hydroxide was formed between the inner wall of the external cylinder and the outer wall of the internal cylinder; the core grew and was supported on the surface of the carbon mixture. After the turning of the internal cylinder was stopped, the carbon mixture was filtered and retrieved, and then was dried for 12 hours in air at the temperature of 100° C. When the filtrate was inspected by ICP spectrometry, it was found that 95% or more of Mn contained in the raw material Mn(CH$_3$COO)$_2$.4H$_2$O was supported. Then, the powder after drying and an aqueous solution that contained LiOH.H$_2$O in an amount that made the ratio of Mn:Li=2:1 were mixed and kneaded, and after drying, the kneaded material was given heat-treatment for 1 hour in air at the temperature of 300° C. so that a composite was obtained. In this composite, an initial particle of LiMn$_2$O$_4$ with a diameter within the range of 10 to 40 nm was formed with good dispersibility. A TG evaluation was performed on this composite at the temperature raising rate of 1° C./minute within the range of room temperature to 650° C. in an air atmosphere. When the weight reduction amount was estimated as carbon, the mass ratio of LiMn$_2$O$_4$ and carbon (the carbon mixture) in the composite was 89:11.

Then, the composite obtained, commercially available LiMn$_2$O$_4$ (initial particle diameter: 2 to 3 μm, secondary particle size: approximately 20 μm) as a coarse particle, and acetyl black conductive agent were mixed at the mass ratio of 30:70:1, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a positive electrode of a lithium ion secondary battery was obtained. The density of the electrode material in the positive electrode obtained was 2.45 g/mL. The density of the electrode material was calculated by the measured value of the volume and weight of the electrode material on the aluminum foil of the positive electrode.

Further, by using the positive electrode obtained, a lithium ion secondary battery in which a 1M LiPF$_6$ ethylene carbonate/diethyl carbonate (1:1) solution was an electrolyte and a counter electrode was lithium was produced. The charging/discharging characteristic of the battery obtained was evaluated under a wide range of conditions of electric current density.

Example 4

The composite produced in Example 3, commercially available LiMn$_2$O$_4$ (initial particle diameter: 2 to 3 μm, secondary particle size: approximately 20 μm) as a coarse particle, and acetylene black as a conductive agent were mixed at the mass ratio of 20:80:1, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a positive electrode of a lithium ion secondary battery was obtained. The density of the electrode material in the positive electrode obtained was 2.68 g/mL.

Further, by using the positive electrode obtained, a lithium ion secondary battery in which a 1M LiPF$_6$ ethylene carbonate/diethyl carbonate (1:1) solution was an electrolyte and a counter electrode was lithium was produced. The charging/discharging characteristic of the battery obtained was evaluated under a wide range of conditions of electric current density.

Comparative Example 3

Commercially available LiMn$_2$O$_4$ (initial particle diameter: 2 to 3 μm, secondary particle size: approximately 20 μm) as a coarse particle and acetylene black as a conductive agent were mixed at the mass ratio of 90:5, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a positive electrode of a lithium ion secondary battery was obtained. The density of the electrode material in the positive electrode obtained was 2.0 g/mL.

Further, by using the positive electrode obtained, a lithium ion secondary battery in which a 1M LiPF$_6$ ethylene carbonate/diethyl carbonate (1:1) solution was an electrolyte and a counter electrode was lithium was produced. The charging/discharging characteristic of the battery obtained was evaluated under a wide range of conditions of electric current density.

Figure 7:
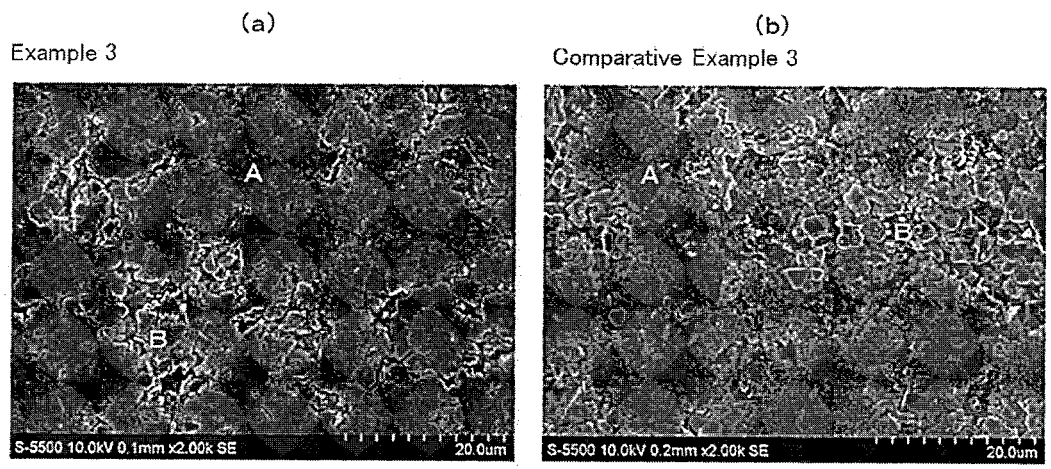
FIG. 7 shows SEM images of positive electrodes in which $LiMn_2O_4$ is an active material; (a) is an image of a working example and (b) is an image of a comparative example.

FIG. 7 shows the SEM images of the surfaces of the positive electrode in Example 3 and the positive electrode of Comparative Example 3, where (a) is an image of Example 3, and (b) is an image of Comparative Example 3. In each image, the crystal found in area B is the initial particle contained in the coarse particle of commercially available LiMn$_2$O$_4$. In area A of image (a), acetylene black and the composite coexist. It is found that they densely fill the gaps between the coarse particles of commercially available LiMn$_2$O$_4$. In area A' of image (b), acetylene black exists. It is found that it also fills the gaps between the coarse particles of commercially available LiMn$_2$O$_4$, but it does so insufficiently compared with the positive electrode in Example 3.

Figure 8:
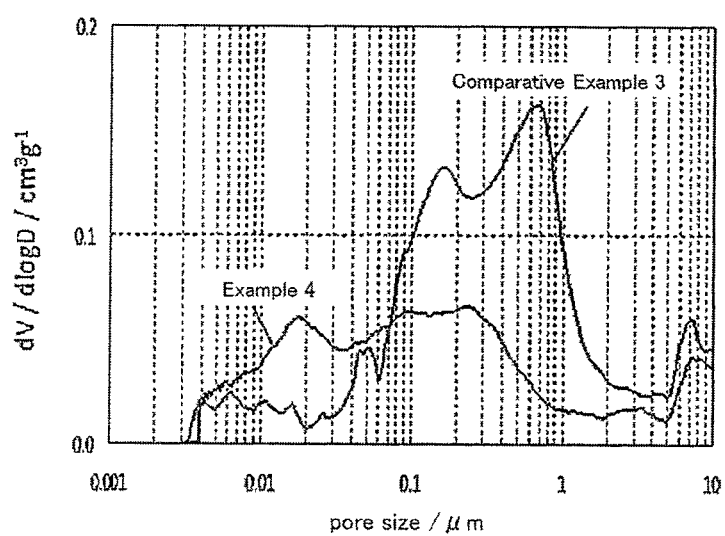
FIG. 8 shows the result of an evaluation of micropore distribution of a positive electrode in which $LiMn_2O_4$ is an active material.

The micropore distribution of the positive electrode in Example 4 and the positive electrode in Comparative Example 3 was evaluated by a method of mercury penetration. The result is shown in FIG. 8. In the positive electrode of Example 4, compared with the positive electrode in Comparative Example 3, the number of pores with a diameter 0.08 μm or more is remarkably small, whereas the number of pores with a diameter of less than 0.08 μm is large. This is considered to reflect the fact that, in the positive electrode of Example 4, acetylene black and the composite densely filled the gap formed between the coarse particles.

Figure 9:
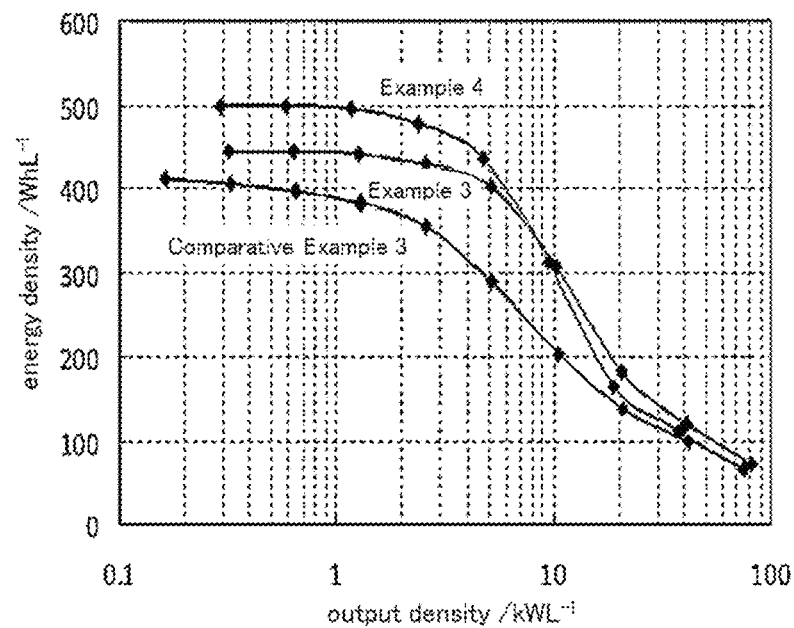
FIG. 9 shows a Ragone plot of a lithium ion secondary battery with a positive electrode in which $LiMn_2O_4$ is an active material.

FIG. 9 shows a Ragone plot of the batteries of Example 3, Example 4 and Comparative Example 3. The batteries of Example 3 and Example 4 showed greater improvement in energy density than the battery of Comparative Example 3. As is shown in FIG. 8, the electrode material of the present invention has pores with a remarkably smaller diameter than that of the electrode material of Comparative Example, but the electrolyte sufficiently entered this small pore and an excellent rate characteristic was obtained.

2) Electrode Materials of a Coarse Particle of $LiNi_{0.5}Mn_{0.3}CO_{0.2}O_2$ and a Composite of $LiMn_2O_4$ and Conductive Carbon, and the Usage of the Electrode Materials Example 5

The procedure of Example 4 was repeated by using, instead of the commercially available $LiMn_2O_4$, the same quantity of commercially available $LiNi_{0.5}Mn_{0.3}CO_{0.2}O_2$ (initial particle diameter: 1 to 2 µm, secondary particle size: 20 µm) as a coarse particle. The density of the electrode material in the positive electrode obtained was 3.2 g/mL.

Comparative Example 4

Commercially available $LiNi_{0.5}Mn_{0.3}Co_{0.2}O_2$ (initial particle diameter: 1 to 2 µm, secondary particle size: approximately 20 µm) as a coarse particle and acetylene black as a conductive agent were mixed at the mass ratio of 90:5, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a positive electrode of a lithium ion secondary battery was obtained. The density of the electrode material in the positive electrode obtained was 2.5 g/mL.

Further, by using the positive electrode obtained, a lithium ion secondary battery in which a 1M $LiPF_6$ ethylene carbonate/diethyl carbonate (1:1) solution was an electrolyte and a counter electrode was lithium was produced. The charging/discharging characteristic of the battery obtained was evaluated under a wide range of conditions of electric current density.

Figure 10:
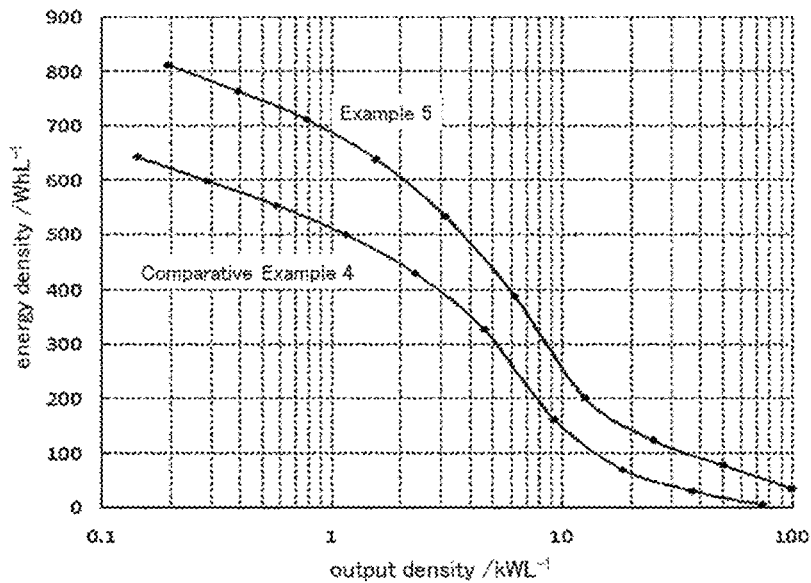
FIG. 10 shows a Ragone plot of a lithium ion secondary battery with a positive electrode in which $LiNi_{0.5}Mn_{0.3}Co_{0.2}O_2$ and $LiMn_2O_4$ are active materials.

FIG. 10 shows a Ragone plot of the batteries in Example 5 and Comparative Example 4. The battery in Example 5 showed greater improvement in energy density than the battery of Comparative Example 4.

3) Electrode Materials of a Coarse Particle of $LiFePO_4$ and a Composite of $LiFePO_4$ and Conductive Carbon, and the Usage of the Electrode Materials Example 6

The composite of $LiFePO_4$ and conductive carbon, which was obtained in Example 2, commercially available $LiFePO_4$ (initial particle diameter: 0.5 to 1 µm, secondary particle size: approximately 2 to 3 µm) as a coarse particle, and acetylene black as a conductive agent were mixed at the mass ratio of 20:80:1, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a positive electrode of a lithium ion secondary battery was obtained. The density of the electrode material in the positive electrode obtained was 2.60 g/mL.

Further, by using the positive electrode obtained, a lithium ion secondary battery in which a 1M $LiPF_6$ ethylene carbonate/diethyl carbonate (1:1) solution was an electrolyte and a counter electrode was lithium was produced. The charging/discharging characteristic of the battery obtained was evaluated under a wide range of conditions of electric current density.

Comparative Example 5

Commercially available $LiFePO_4$ (initial particle diameter: 0.5 to 1 µm, secondary particle size: approximately 2 to 3 µm) as a coarse particle and acetylene black as a conductive agent were mixed at the mass ratio of 85:10, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a positive electrode of a lithium ion secondary battery was obtained. The density of the electrode material in the positive electrode obtained was 2.00 g/mL.

Further, by using the positive electrode obtained, a lithium ion secondary battery in which a 1M $LiPF_6$ ethylene carbonate/diethyl carbonate (1:1) solution was an electrolyte and a counter electrode was lithium was produced. The charging/discharging characteristic of the battery obtained was evaluated under a wide range of conditions of electric current density.

Figure 11:
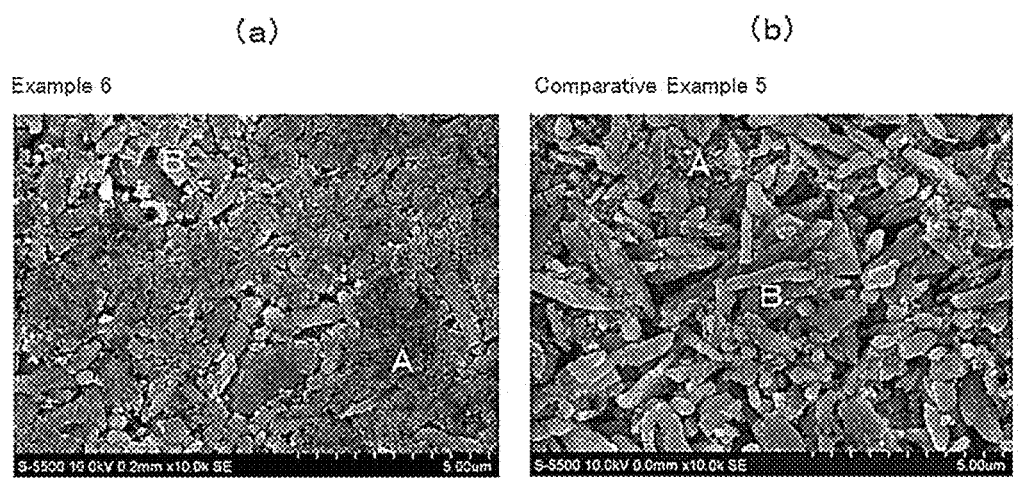
FIG. 11 shows SEM images of positive electrodes in which $LiFePO_4$ is an active material; (a) is an image of a working example and (b) is an image of a comparative example.

FIG. 11 shows the SEM images of the surfaces of the positive electrode in Example 6 and the positive electrode of Comparative Example 5, where (a) is an image of Example 6 and (b) is an image of Comparative Example 5. In each image, the crystal found in area B is the initial particle contained in the coarse particle of commercially available $LiFePO_4$. In area A of image (a), acetylene black and the composite coexist. It is found that they densely fill the gaps between the coarse particles of commercially available $LiFePO_4$. In area A' of image (b) acetylene black exists, but acetylene black does not densely fill the gaps between the coarse particles of $LiFePO_4$.

Figure 12:
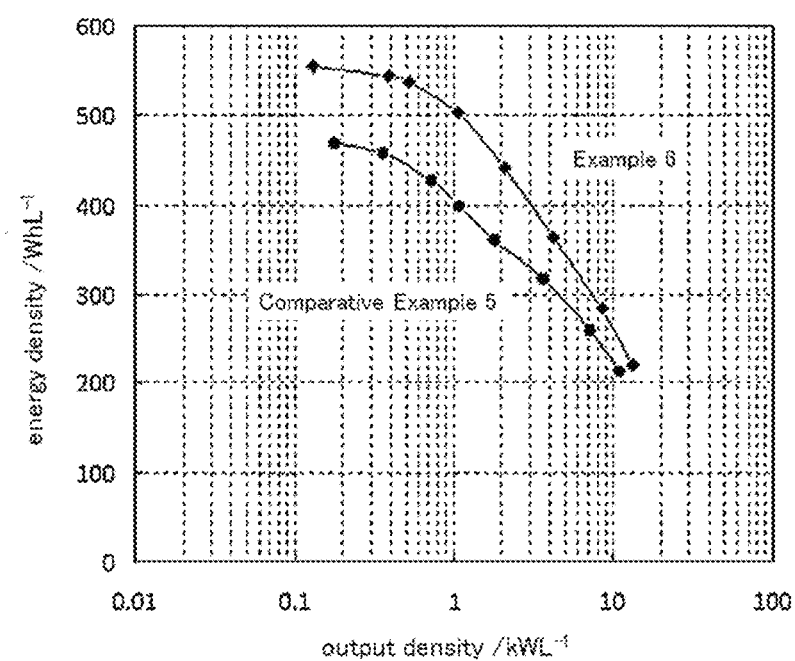
FIG. 12 shows a Ragone plot of a lithium ion secondary battery with a positive electrode in which $LiFePO_4$ is an active material.

FIG. 12 shows a Ragone plot of the batteries in Example 6 and Comparative Example 5. The battery in Example 6 showed greater improvement in energy density than the battery of Comparative Example 5.

4) Electrode Materials of a Coarse Particle of $LiCoO_2$ and a Composite of $LiCoO_2$ and Conductive Carbon, and the Usage of the Electrode Materials Example 7

The composite of $LiCoO_2$ and conductive carbon, which was obtained in Example 1, commercially available $LiCoO_2$ (initial particle diameter: approximately 5 µm) as a coarse particle, and acetylene black as a conductive agent were mixed at the mass ratio of 20:80:1, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a positive electrode of a lithium ion secondary battery was obtained. The density of the electrode material in the positive electrode obtained was 3.9 g/mL.

Further, by using the positive electrode obtained, a lithium ion secondary battery in which a 1M $LiPF_6$ ethylene carbonate/diethyl carbonate (1:1) solution was an electrolyte and a counter electrode was lithium was produced. The charging/discharging characteristic of the battery obtained was evaluated under a wide range of conditions of electric current density.

Comparative Example 6

Commercially available $LiCoO_2$ (average initial particle diameter: approximately 5 μm) as a coarse particle and acetylene black as a conductive agent were mixed at the mass ratio of 90:5, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a positive electrode of a lithium ion secondary battery was obtained. The density of the electrode material in the positive electrode obtained was 3.2 g/mL.

Further, by using the positive electrode obtained, a lithium ion secondary battery in which a 1M $LiPF_6$ ethylene carbonate/diethyl carbonate (1:1) solution was an electrolyte and a counter electrode was lithium was produced. The charging/discharging characteristic of the battery obtained was evaluated under a wide range of conditions of electric current density.

Figure 13:
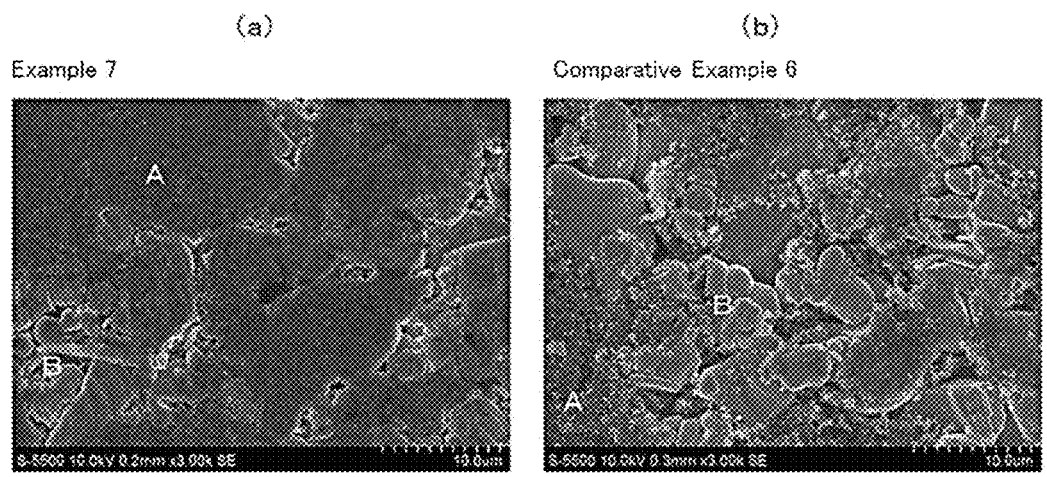
FIG. 13 shows SEM images of positive electrodes in which $LiCoO_2$ is an active material; (a) is an image of a working example and (b) is an image of a comparative example.

FIG. 13 shows the SEM images of the surfaces of the positive electrode in Example 7 and the positive electrode of Comparative Example 6, where (a) is an image of Example 7 and (b) is an image of Comparative Example 6. In each image, the crystal found in area B is the initial particle contained in the coarse particle of commercially available $LiCoO_2$. In area A of image (a), acetylene black and the composite coexist. It is found that they densely fill the gap between the coarse particles of commercially available $LiCoO_2$. In area A' of image (b), acetylene black exists. It is found that acetylene black also fills the gaps between the coarse particles of the commercially available $LiCoO_2$, but it does so insufficiently compared with the positive electrode in Example 7.

Figure 14:
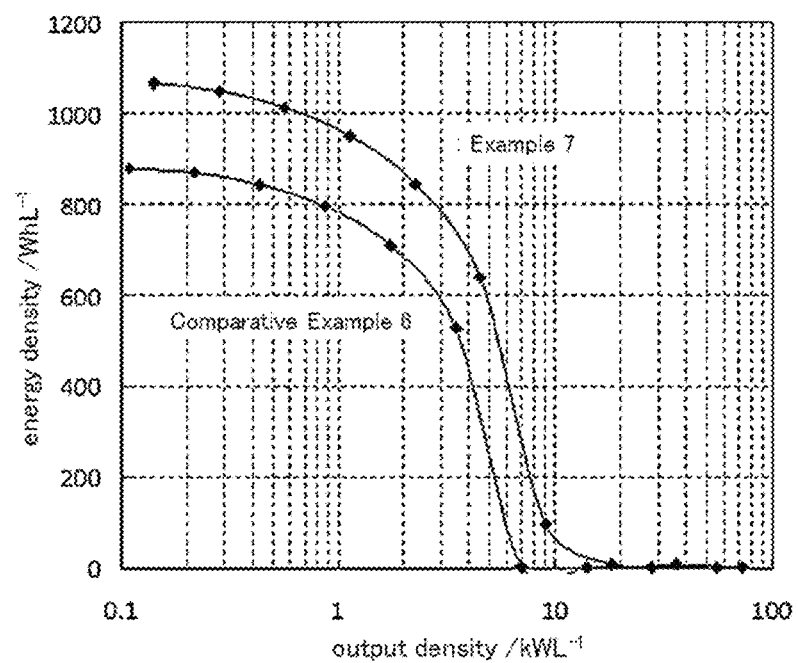
FIG. 14 shows a Ragone plot of a lithium ion secondary battery with a positive electrode in which $LiCoO_2$ is an active material.

FIG. 14 shows a Ragone plot of the batteries in Example 7 and Comparative Example 6. The battery in Example 7 showed greater improvement in energy density than the battery of Comparative Example 6.

5) Electrode Materials of a Coarse Particle of $LiNi_{0.5}Mn_{0.3}Co_{0.2}O_2$ and a Composite of $LiCoO_2$ and Conductive Carbon, and the Usage of the Electrode Materials

Example 8

The composite of $LiCoO_2$ and conductive carbon, which was obtained in Example 1, commercially available $LiNi_{0.5}Mn_{0.3}Co_{0.2}O_2$ (initial particle diameter: 1 to 2 pun, secondary particle diameter: approximately 20 pun) as a coarse particle, and acetylene black as a conductive agent were mixed at the mass ratio of 20:80:1, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a positive electrode of a lithium ion secondary battery was obtained. The density of the electrode material in the positive electrode obtained was 3.2 g/mL.

Further, by using the positive electrode obtained, a lithium ion secondary battery in which a 1M $LiPF_6$ ethylene carbonate/diethyl carbonate (1:1) solution was an electrolyte and a counter electrode was lithium was produced. The charging/discharging characteristic of the battery obtained was evaluated under a wide range of conditions of electric current density.

Comparative Example 7

Commercially available $LiNi_{0.5}Mn_{0.3}Co_{0.2}O_2$ (initial particle diameter: 1 to 2 μm, secondary particle diameter: approximately 20 μm) as a coarse particle and acetylene black as a conductive agent were mixed at the mass ratio of 90:5, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a positive electrode of a lithium ion secondary battery was obtained. The density of the electrode material in the positive electrode obtained was 2.5 g/mL.

Further, by using the positive electrode obtained, a lithium ion secondary battery in which a 1M $LiPF_6$ ethylene carbonate/diethyl carbonate (1:1) solution was an electrolyte and a counter electrode was lithium was produced. The charging/discharging characteristic of the battery obtained was evaluated under a wide range of conditions of electric current density.

Figure 15:
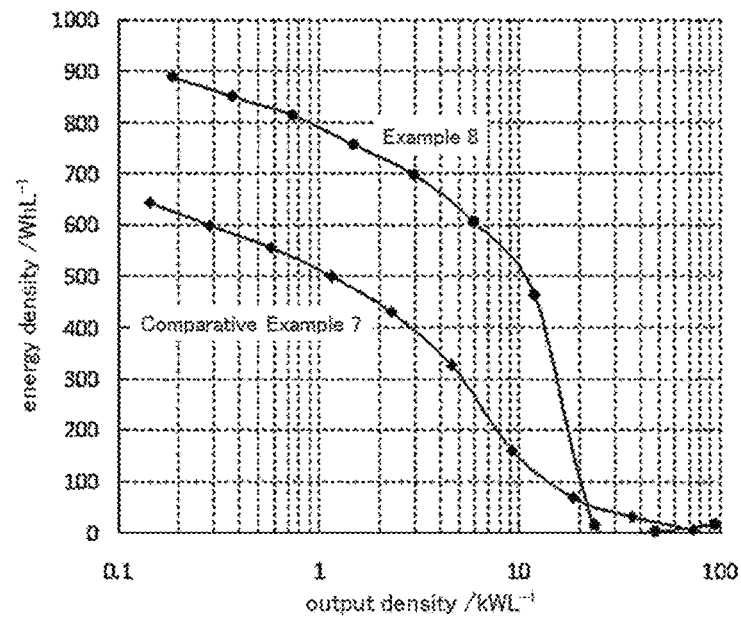
FIG. 15 shows a Ragone plot of a lithium ion secondary battery with a positive electrode in which $LiNi_{0.5}Mn_{0.3}Co_{0.2}O_2$ and $LiCoO_2$ are active materials.

FIG. 15 shows a Ragone plot of the batteries in Example 8 and Comparative Example 7. The battery in Example 8 showed greater improvement in energy density than the battery of Comparative Example 7.

6) Electrode Materials of a Coarse Particle of $LiMn_2O_4$ and a Composite of $LiCoO_2$ and Conductive Carbon, and the Usage of the Electrode Materials

Example 9

The composite of $LiCoO_2$ and conductive carbon, which was obtained in Example 1, commercially available $LiMn_2O_4$ (initial particle diameter: approximately 5 μm) as a coarse particle, and acetylene black as a conductive agent were mixed at the mass ratio of 20:80:1, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a positive electrode of a lithium ion secondary battery was obtained. The density of the electrode material in the positive electrode obtained was 3.20 g/mL.

Further, by using the positive electrode obtained, a lithium ion secondary battery in which a 1M $LiPF_6$ ethylene carbonate/diethyl carbonate (1:1) solution was an electrolyte and a counter electrode was lithium was produced. The charging/discharging characteristic of the battery obtained was evaluated under a wide range of conditions of electric current density.

Comparative Example 8

Commercially available $LiMn_2O_4$ (average initial particle diameter: approximately 5 μm) as a coarse particle and acetylene black as a conductive agent were mixed at the mass ratio of 90:5, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a positive electrode of a lithium ion secondary battery was obtained. The density of the electrode material in the positive electrode obtained was 2.5 g/mL.

Further, by using the positive electrode obtained, a lithium ion secondary battery in which a 1M LiPF$_6$ ethylene carbonate/diethyl carbonate (1:1) solution was an electrolyte and a counter electrode was lithium was produced. The charging/discharging characteristic of the battery obtained was evaluated under a wide range of conditions of electric current density.

Figure 16:
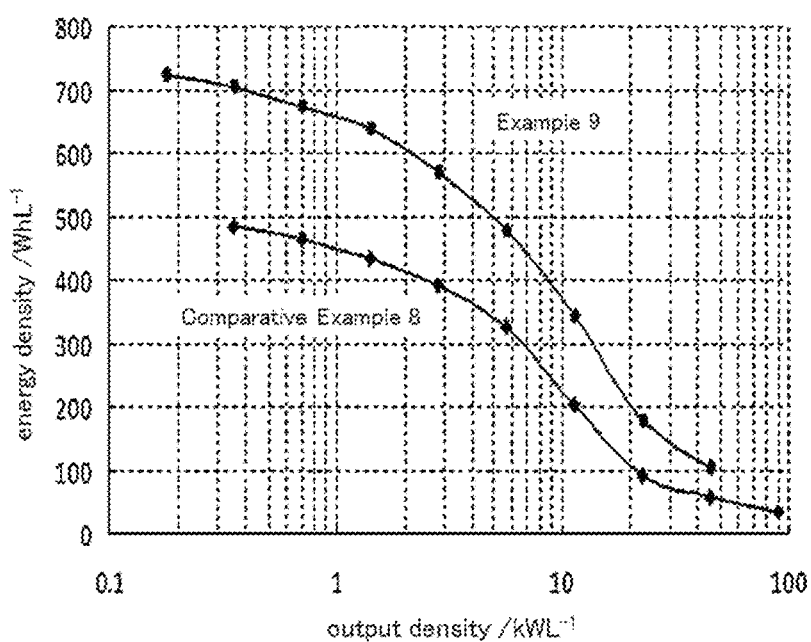
FIG. 16 shows a Ragone plot of a lithium ion secondary battery with a positive electrode in which $LiMn_2O_4$ and $LiCoO_2$ are active materials.

FIG. 16 shows a Ragone plot of the batteries in Example 9 and Comparative Example 8. The battery in Example 9 showed greater improvement in energy density than the battery of Comparative Example 8.

7) Electrode Materials of a Coarse Particle of Li$_4$Ti$_5$O$_{12}$ and a Composite of Li$_4$Ti$_5$O$_{12}$ and Conductive Carbon, and the Usage of the Electrode Materials Example 10

Acetic acid and lithium acetate in a quantity of 1.8 mol and 1 mol, respectively, per mol of titanium isopropoxide were dissolved into 1000 mL of mixed solvent in which isopropanol and water were mixed at the mass ratio of 90:10. The fluid obtained, titanium isopropoxide 1 mol, and carbon nanofiber (diameter: approximately 20 nm, length: several hundred nm) the quantity of which made the ratio of Li$_4$Ti$_5$O$_{12}$:C equal to 80:20 were introduced into the internal cylinder of the reactor used in Example 1 and then the internal cylinder was turned for 300 seconds so that the centrifugal force of 66000 kgms$^{-2}$ would be added to the reaction solution. In the meantime, a thin film of the reactant was formed between the inner wall of the external cylinder and the outer wall of the internal cylinder, and a chemical reaction proceeded because shear stress and centrifugal force were added to this thin film, and carbon nanofiber supporting a Li$_4$Ti$_5$O$_{12}$ precursor in a highly dispersed state was obtained. After the turning of the internal cylinder was stopped, the carbon nanofiber was filtered and retrieved, dried in a vacuum for 17 hours at 80° C. and heat-treated in nitrogen for 3 minutes at 700° C., and then a composite was obtained. In this composite, an initial particle of Li$_4$Ti$_5$O$_{12}$ with a diameter 5 to 100 nm was formed with good dispersibility. A TG evaluation of this composite was performed in an air atmosphere at the temperature raising rate of 1° C./minute within the range of room temperature to 650° C. When the weight reduction amount was estimated as carbon, the mass ratio of Li$_4$Ti$_5$O$_{12}$ and carbon (carbon nanofiber) in the composite was 80:20.

Then, the composite obtained, commercially available Li$_4$Ti$_5$O$_{12}$ (average secondary particle size: approximately 7 μm) as a coarse particle, and acetylene black as a conductive agent were mixed at the mass ratio of 10:90:1, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a negative electrode of a lithium ion secondary battery was obtained. The density of the electrode material in the negative electrode obtained was 2.85 g/mL.

Commercially available LiMn$_2$O$_4$ (average initial particle diameter: approximately 5 μm) as a coarse particle and acetylene black as a conductive agent were mixed at the mass ratio of 90:5, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a positive electrode of a lithium ion secondary battery (operating at 4 V against Li/Li$^+$) was obtained.

Further, by using the negative electrode and positive electrode obtained, a lithium ion secondary battery in which a 1M LiPF$_6$ ethylene carbonate/diethyl carbonate (1:1) solution was an electrolyte was produced. The charging/discharging characteristic of the battery obtained was evaluated under a wide range of conditions of electric current density.

Example 11

The composite obtained in Example 10, commercially available Li$_4$Ti$_5$O$_{12}$ (average secondary particle diameter: approximately 7 μm) as a coarse particle, and acetylene black as a conductive agent were mixed at the mass ratio of 20:80:1, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a negative electrode of a lithium ion secondary battery was obtained. The density of the electrode material in the negative electrode obtained was 2.55 g/mL.

Further, by using the negative electrode obtained and the positive electrode obtained in Example 10, a lithium ion secondary battery in which a 1M LiPF$_6$ ethylene carbonate/ diethyl carbonate (1:1) solution was an electrolyte was produced. The charging/discharging characteristic of the battery obtained was evaluated under a wide range of conditions of electric current density.

Comparative Example 9

Commercially available Li$_4$Ti$_5$O$_{12}$ (average secondary particle diameter: approximately 7 μm) as a coarse particle and acetylene black as a conductive agent were mixed at the mass ratio of 90:5, and then 5% by mass of the total of polyvinylidene fluoride and an adequate quantity of N-methylpyrrolidone were added and kneaded adequately so that a slurry was formed. The slurry was coated on aluminum foil and then was dried and given rolling treatment so that a negative electrode of a lithium ion secondary battery was obtained. The density of the electrode material in the negative electrode obtained was 2.0 g/mL.

Further, by using the negative electrode obtained and the positive electrode obtained in Example 10, a lithium ion secondary battery in which a 1M LiPF$_6$ ethylene carbonate/ diethyl carbonate (1:1) solution was an electrolyte was produced. The charging/discharging characteristic of the battery obtained was evaluated under a wide range of conditions of electric current density.

Figure 17:
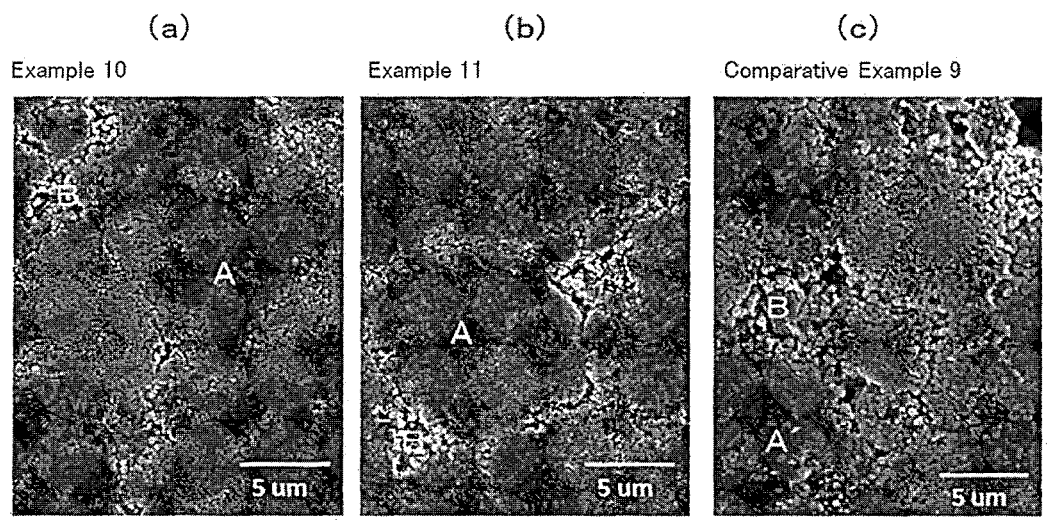
FIG. 17 shows SEM images of a negative electrode in which $Li_4Ti_5O_{12}$ is an active material; (a) and (b) are images of a working example and (c) is an image of a comparative example.

FIG. 17 shows the SEM images of the surfaces of the negative electrodes in Examples 10 and 11 and Comparative Example 9, where (a) is an image of Example 10, (b) is an image of Example 11, and (c) is an image of Comparative Example 9. In each image, the crystal found in area B is the initial particle contained in the coarse particle of commercially available Li$_4$Ti$_5$O$_{12}$. In area A of images (a) and (b), acetylene black and the composite coexist. It is found that they densely fill the gaps between the coarse particles of commercially available Li$_4$Ti$_5$O$_{12}$. In area A' of image (c), acetylene black exists. It is found that acetylene black also fills the gaps between the coarse particles of commercially available Li$_4$Ti$_5$O$_{12}$, but does so insufficiently compared with the negative electrode in Examples 10 and 11.

Figure 18:
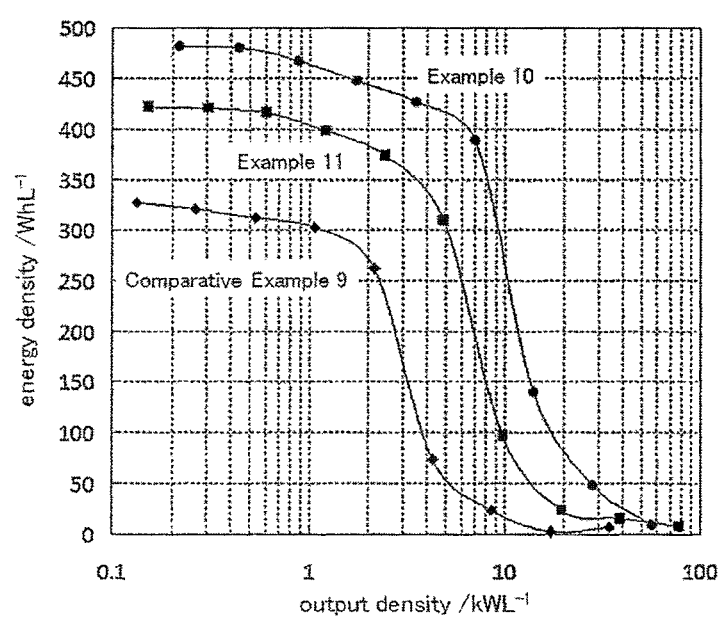
FIG. 18 shows a Ragone plot of a lithium ion secondary battery with a negative electrode in which $Li_4Ti_5O_{12}$ is an active material.

FIG. 18 shows a Ragone plot of the batteries in Examples 10 and 11 and Comparative Example 9. The batteries in Examples 10 and 11 showed greater improvement in energy density than the battery of Comparative Example 9.

INDUSTRIAL APPLICABILITY

By the present invention, a lithium ion secondary battery with high energy density is obtained.

What is claimed is:

1. An electrode material for a lithium ion secondary battery comprising:
    particles of a first active material that can function as a positive electrode active material or a negative electrode active material of a lithium ion secondary battery; and
    particles of a composite formed of particles of conductive carbon and particles of a second active material attached to the particles of the conductive carbon that can function as an active material of the same electrode as the first active material, wherein:
    the particles of the first active material having a diameter which is larger than the particles of the composite and is in the range of 100 nm to 100 μm,
    the particles of the conductive carbon in the composite having a diameter in a range of 10 nm to 300 nm, and the particles of the second active material in the composite having a diameter in a range of 1 nm to 200 nm,
    at least a part of a structure in the particles of the conductive carbon in the composite being destroyed,
    the particles of the composite filled in a gap formed between the particles of the first active material by kneading the particles of the composite and the particles of the first active material to obtain a kneaded material and adding pressure to the kneaded material, and
    the mixture ratio of the particles of the composite and the particles of the first active material being within the range of the mass ratio of 5 to 30:95 to 70.

2. The electrode material for a lithium ion secondary battery according to claim 1, wherein the second active material is a metal oxide.

3. The electrode material for a lithium ion secondary battery according to claim 1, wherein the electrode material further comprises particles of a conductive agent composed of conductive carbon which is different from the conductive carbon in the particles of the composite, the particles of the conductive agent have a diameter which is smaller than the particles of the first active material and is in the range of 10 nm to 300 nm, and the particles of the conductive agent are filled in the gap formed between the particles of the first active material.

4. The electrode material for a lithium ion secondary battery according to claim 3, wherein the electrical conductivity of a mixture of the composite and the conductive agent is $10^{-3}$ s/cm or more.

5. The electrode material for a lithium ion secondary battery according to claim 2, wherein the electrode material further comprises particles of a conductive agent composed of conductive carbon which is different from the conductive carbon in the particles of the composite, the particles of the conductive agent have a diameter which is smaller than the particles of the first active material and is in the range of 10 nm to 300 nm, and the particles of the conductive agent are filled in the gap formed between the particles of the first active material.

6. The electrode material for a lithium ion secondary battery according to claim 5, wherein the electrical conductivity of a mixture of the composite and the conductive agent is $10^{-3}$ s/cm or more.

7. A method for producing an electrode material for a lithium ion secondary battery according to claim 2, wherein the method comprises:
    1) a composite manufacturing process to prepare the particles of the composite formed of the particles of the conductive carbon and the particles of the second active material of the metal oxide attached to the particles of the conductive carbon, which comprises:
        a) a preparation step to introduce into a rotatable reactor a reaction solution prepared by adding conductive carbon powder to a solution in which at least one compound of a metal that constitutes the metal oxide is dissolved;
        b) a supporting step to support the compound of a metal and/or its reaction product by the conductive carbon powder by turning the reactor to add shear stress and centrifugal force of 1500 $kgms^{-2}$ or more to the reaction solution; and
        c) a heat treatment step to transform the compound of a metal and/or its reaction product supported by the conductive carbon powder into the particles of the second active material having a diameter in a range of 1 nm to 200 nm by heat-treating the conductive carbon powder supporting the compound of a metal and/or its reaction product, and during which, the particles of the conductive carbon having a diameter in a range of 10 nm to 300 nm in which at least a part of a structure in the particles is destroyed is formed from the conductive carbon powder,
    and
    2) a kneading and pressurizing process to knead the particles of the composite obtained by the composite manufacturing process and the particles of the first active material with a diameter which is larger than the particles of the composite and is in the range of 100 nm to 100 μm within the range of the mass ratio of 5 to 30:95 to 70 to obtain a kneaded material and to add pressure to the kneaded material so that the particles of the first active material draw near to each other and the particles of the composite are pushed out to fill the gap formed between the particles of the first active material.

8. The method for producing an electrode material for a lithium ion secondary battery according to claim 7, wherein particles of a conductive agent composed of conductive carbon which is different from the conductive carbon in the particles of the composite is further comprised in the electrode material, the particles of the conductive agent have a diameter which is smaller than the particles of the first active material and is in a range of 10 nm to 300 nm, and the particles of the composite, the particles of the first active material, and the particles of the conductive agent are kneaded in the kneading and pressurizing process.

9. A lithium ion secondary battery with a positive electrode and/or a negative electrode having an active material layer that comprises the electrode material according to claim 1.

10. A lithium ion secondary battery with a positive electrode and/or a negative electrode having an active material layer that comprises the electrode material according to claim 2.

11. A lithium ion secondary battery with a positive electrode and/or a negative electrode having an active material layer that comprises the electrode material according to claim 5.

* * * * *